(12) United States Patent
Li et al.

(10) Patent No.: US 8,789,995 B2
(45) Date of Patent: Jul. 29, 2014

(54) LIGHT GUIDE WITH AT LEAST PARTIALLY NON-TRANSMISSIVE COATING ON LEDGE REGION

(75) Inventors: Kebin Li, Fremont, CA (US); Ion Bita, San Jose, CA (US)

(73) Assignee: Qualcomm Mems Technologies, Inc., San Diego, CA (US)

( * ) Notice: Subject to any disclaimer, the term of this patent is extended or adjusted under 35 U.S.C. 154(b) by 219 days.

(21) Appl. No.: 13/344,771

(22) Filed: Jan. 6, 2012

(65) Prior Publication Data

US 2013/0176317 A1 Jul. 11, 2013

(51) Int. Cl.
*F21V 7/04* (2006.01)
*G06F 3/038* (2013.01)
*G09G 5/00* (2006.01)

(52) U.S. Cl.
USPC ............................. 362/615; 362/611; 345/204

(58) Field of Classification Search
CPC ...... G06F 3/038; G09G 5/00; G02B 6/00216; G02B 6/0036; G02B 6/0038; G02B 6/0043; G02B 6/0046; G02B 6/0055; G02B 6/0068
USPC ........... 345/204; 362/23.1, 23.16, 23.17, 600, 362/608, 611, 615
See application file for complete search history.

(56) References Cited

U.S. PATENT DOCUMENTS

| 6,053,619 | A | 4/2000 | Nakamura et al. |
| 7,699,516 | B1 | 4/2010 | Lee |
| 2008/0204624 | A1 | 8/2008 | Fu |
| 2008/0284308 | A1 | 11/2008 | Pang |
| 2009/0201565 | A1 | 8/2009 | Bita et al. |
| 2010/0231510 | A1* | 9/2010 | Sampsell et al. .............. 345/156 |
| 2010/0302218 | A1* | 12/2010 | Bita et al. ...................... 345/204 |
| 2010/0302803 | A1* | 12/2010 | Bita et al. ...................... 362/606 |
| 2011/0169428 | A1 | 7/2011 | Wang et al. |
| 2011/0182086 | A1 | 7/2011 | Mienko et al. |

FOREIGN PATENT DOCUMENTS

| EP | 2161600 A1 | 3/2010 |
| WO | 2005011012 A1 | 2/2005 |
| WO | 2008045312 A1 | 4/2008 |
| WO | 2011074365 A1 | 6/2011 |

OTHER PUBLICATIONS

International Search Report and Written Opinion—PCT/US2012/070391, International Search Authority—European Patent Office—Jun. 27, 2013.
Partial International Search Report—PCT/US2012/070391—ISA/EPO—Apr. 18, 2013.

\* cited by examiner

*Primary Examiner* — Jacinta M Crawford
(74) *Attorney, Agent, or Firm* — Knobbe, Martens, Olson & Bear LLP

(57) ABSTRACT

This disclosure provides systems, methods and apparatus related to an illumination system for a display device. In one aspect, the illumination system includes a light guide having a view region, which directly overlies display elements of a display, and a ledge region between the view region and a light source that injects light into the light guide. The ledge region is coated with an at least partially non-transmissive layer. The layer can be at least partially absorptive and/or at least partially reflective. In some implementations, the layer can include microstructures configured to turn steep-angle light such that it is redirected across the light guide at a shallower angle. In some implementations, the boundary between the ledge region and the view region of the light guide can have a nonlinear shape.

37 Claims, 15 Drawing Sheets

Common Voltages

| Segment Voltages | $VC_{ADD\_H}$ | $VC_{HOLD\_H}$ | $VC_{REL}$ | $VC_{HOLD\_L}$ | $VC_{ADD\_L}$ |
|---|---|---|---|---|---|
| $VS_H$ | Stable | Stable | Relax | Stable | Actuate |
| $VS_L$ | Actuate | Stable | Relax | Stable | Stable |

LIGHT GUIDE WITH AT LEAST PARTIALLY NON-TRANSMISSIVE COATING ON LEDGE REGION

TECHNICAL FIELD

This disclosure relates to illumination systems, including illumination systems for displays, particularly illumination systems having light guides with a ledge region between a light source and a view region of the light guide, and to electromechanical systems.

DESCRIPTION OF THE RELATED TECHNOLOGY

Electromechanical systems include devices having electrical and mechanical elements, actuators, transducers, sensors, optical components (e.g., mirrors) and electronics. Electromechanical systems can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, and/or other micromachining processes that etch away parts of substrates and/or deposited material layers, or that add layers to form electrical and electromechanical devices.

One type of electromechanical systems device is called an interferometric modulator (IMOD). As used herein, the term interferometric modulator or interferometric light modulator refers to a device that selectively absorbs and/or reflects light using the principles of optical interference. In some implementations, an interferometric modulator may include a pair of conductive plates, one or both of which may be transparent and/or reflective, wholly or in part, and capable of relative motion upon application of an appropriate electrical signal. In an implementation, one plate may include a stationary layer deposited on a substrate and the other plate may include a reflective membrane separated from the stationary layer by an air gap. The position of one plate in relation to another can change the optical interference of light incident on the interferometric modulator. Interferometric modulator devices have a wide range of applications, and are anticipated to be used in improving existing products and creating new products, especially those with display capabilities.

Reflected ambient light is used to form images in some display devices, such as reflective displays using display elements formed by interferometric modulators. The perceived brightness of these displays depends upon the amount of light that is reflected towards a viewer. In low ambient light conditions, light from an illumination device with an artificial light source can be used to illuminate the reflective display elements, which then reflect the light towards a viewer to generate an image. To meet market demands and design criteria for display devices, including reflective and transmissive displays, new illumination devices and methods for forming them are continually being developed.

SUMMARY

The systems, methods and devices of the disclosure each have several innovative aspects, no single one of which is solely responsible for the desirable attributes disclosed herein.

One innovative aspect of the subject matter described in this disclosure can be implemented in an illumination system including a first light source, and a light guide. The light guide can include a top major surface, a bottom major surface, a first light-input edge for receiving light from the first light source, a view region including a plurality of light-turning features, and a ledge region that includes the area between the first light-input edge and the view region. The top and/or bottom major surfaces of the light guide can be coated in the ledge region with an at least partially transmissive layer. In some implementations, the partially transmissive layer can be reflective. In certain implementations, the partially transmissive layer can be substantially absorptive. In some implementations, the at least partially transmissive layer can include a plurality of microstructures configured to turn incident light from the first light source such that the angle of the turned light with respect to the top major surface is smaller than the angle of incidence of the light with respect to the top major surface. In certain implementations, the boundary between the ledge region and the view region can have a nonlinear shape. In some implementations, the at least partially non-transmissive layer can include a plurality of sub-layers. In certain implementations, the plurality of sub-layers can form a three-layer black mask including a reflective layer, an underlying optically transmissive layer, and a partially reflective layer underlying the optically transmissive layer. In some implementations, the first light source can be disposed adjacent to the first light-input edge, and a second light source can be disposed adjacent to the second light-input edge opposite the first, and the ledge region can further include the area between the second light-input edge and the view region. In certain implementations, a first transverse edge can be arranged between the first light-input edge and the second light-input edge, and a second transverse edge can be arranged opposite the first transverse edge and between the first light-input edge and the second light-input edge. The ledge region can further include the area between each of the first and second transverse edges and the view region, such that the ledge region circumscribes the view region.

Another innovative aspect of the subject matter described in this disclosure can be implemented in an illumination system including a light source and a light guide. The light guide can include a top major surface, a bottom major surface opposite the top major surface, a view region that includes means for turning light, a ledge region between the first light-input edge and the view region, and means for blocking light from exiting the light guide in the ledge region. The light blocking means can be disposed on at least one of the top major surface and the bottom major surface of the light guide in the ledge region.

Another innovative aspect of the subject matter described in this disclosure can be implemented in a method of manufacturing an illumination system. The method includes providing a light guide including a top major surface, a bottom major surface, a first edge for receiving light from a light source, and a view region including a plurality of light turning features. The method further includes providing a plurality of light-turning features in a view region of the light guide, and providing an at least partially non-transmissive layer on at least one of the top major surface and the bottom major surface of the light guide in a ledge region, the ledge region including the area between the first edge and the view region. In some implementations, the partially non-transmissive layer can be deposited onto at least one of the top major surface and the bottom major surface of the light guide by chemical vapor deposition. In certain implementations, the partially non-transmissive layer can be patterned to form a boundary having a nonlinear shape between the at least partially non-transmissive layer and the view region. In some implementations, providing the at least partially non-transmissive layer can include forming a plurality of microstructures on at least one of the top major surface and the bottom major surface of the light guide in the ledge region, the microstructures configured to turn incident light from the light source such that the angle of the turned light with respect to the top major surface is smaller than the angle of incidence of the light with respect to the top major surface. In certain implementations, a light source can be disposed adjacent to the first edge, the light source configured to inject light into the first edge.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
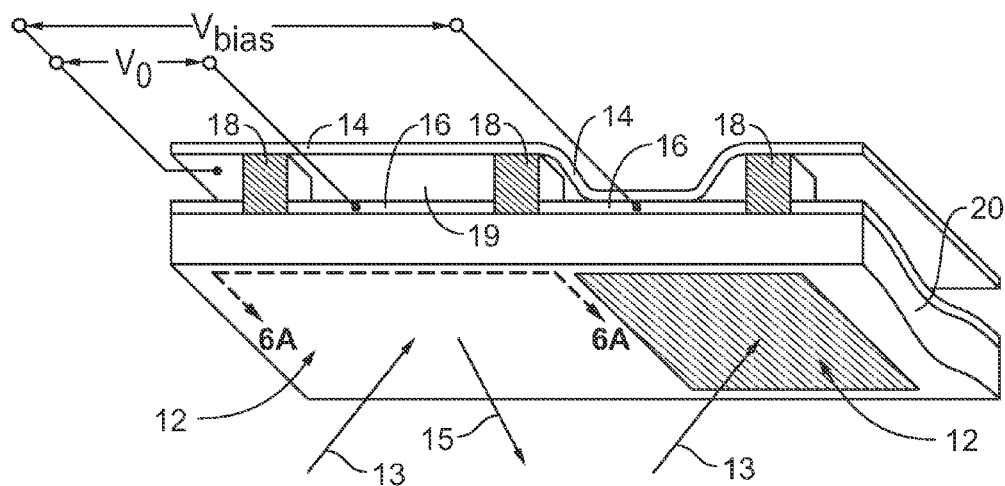
FIG. 1 shows an example of an isometric view depicting two adjacent pixels in a series of pixels of an interferometric modulator (IMOD) display device.

The following detailed description is directed to certain implementations for the purposes of describing the innovative aspects. However, the teachings herein can be applied in a multitude of different ways. The described implementations may be implemented in any device that is configured to display an image, whether in motion (e.g., video) or stationary (e.g., still image), and whether textual, graphical or pictorial. More particularly, it is contemplated that the implementations may be implemented in or associated with a variety of electronic devices such as, but not limited to, mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, GPS receivers/navigators, cameras, MP3 players, camcorders, game consoles, wrist watches, clocks, calculators, television monitors, flat panel displays, electronic reading devices (e.g., e-readers), computer monitors, auto displays (e.g., odometer display, etc.), cockpit controls and/or displays, camera view displays (e.g., display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (e.g., MEMS and non-MEMS), aesthetic structures (e.g., display of images on a piece of jewelry) and a variety of electromechanical systems devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes, and electronic test equipment. Thus, the teachings are not intended to be limited to the implementations depicted solely in the Figures, but instead have wide applicability as will be readily apparent to a person having ordinary skill in the art.

Illumination systems for displays can have light guides that include a "ledge" region between a light source positioned at the edge of the light guide, and a view region under which display elements are positioned and in which an image may be viewed by a viewer. Light may leak out of the ledge region for various reasons. Generally, a light guide may allow light to propagate through it by total internal reflection (TIR), in which light strking a light guide surface at a shallower angle (measured relative to the surface) than the critical angle is reflected off that surface. Although much of the light emitted from the light sources may be injected into the light guide at sufficiently shallow angles for TIR, some of the light may enter the light guide at angles that cause them to strike major surfaces of the light guide at steeper angles (relative to the surface) than the critical angle. As a result, this steep-angle light may not undergo TIR and may leak out of those major surfaces. This light leakage can be most pronounced in the ledge regions, where the steep-angle light may first impinge on one of the major surfaces. Additionally, due to localized imperfections in the major surfaces, light that would otherwise reflect off the surface may not undergo TIR because the imperfection causes a part of the surface to be angled, such that the angle of incidence of the light on the imperfection may be outside of the angles required for TIR. As a result, light leaks out of the imperfection. Due to light leakage, image quality may be degraded, with the light leakage reducing the perceived contrast of the display, causing illumination uniformities, and/or causing glare. To combat this leakage, an at least partially non-transmissive layer can be applied to coat the ledge region. In some implementations, the layer may be partially absorptive and/or partially reflective. The layer may cover various portions of the upper and lower surfaces of the light guide in the ledge regions. In certain implementations, light-turning microstructures can be formed in the ledge regions with the partially non-transmissive layer. These microstructures can turn steep-angle light such that it is redirected at a shallower angle to faciliate propagation by TIR across the light guide. In certain implementations, the boundary between the ledge regions and the view region may be arranged in a nonlinear configuration, in oder to decrease the appearance of visual artifacts, such as bright bands, at the edges of the view region, as discussed further herein.

Particular implementations of the subject matter described in this disclosure can be implemented to realize one or more of the following potential advantages. For example, various implementations of the illumination systems disclosed herein may achieve increased visual contrast, improved illumination uniformity, and the reduction of illumination artifacts by reducing light leakage in the ledge region. In implementations including a partially reflective layer or light turning microstructures with the at least partially non-transmissive layer, efficiency and display brightness may be improved by redirecting light that would otherwise escape the light guide in the ledge region, such that the redirected light can propagate along the length of the light guide and thereby be used to illuminate a display. In addition, the light turning features can be configured to disperse light in the plane of the light guide to further increase illumination uniformity.

An example of a suitable MEMS device, to which the described implementations may apply, is a reflective display device. Reflective display devices can incorporate interferometric modulators (IMODs) to selectively absorb and/or reflect light incident thereon using principles of optical interference. IMODs can include an absorber, a reflector that is movable with respect to the absorber, and an optical resonant cavity defined between the absorber and the reflector. The reflector can be moved to two or more different positions, which can change the size of the optical resonant cavity and thereby affect the reflectance of the interferometric modulator. The reflectance spectrums of IMODs can create fairly broad spectral bands which can be shifted across the visible wavelengths to generate different colors. The position of the spectral band can be adjusted by changing the thickness of the optical resonant cavity, i.e., by changing the position of the reflector.

FIG. 1 shows an example of an isometric view depicting two adjacent pixels in a series of pixels of an interferometric modulator (IMOD) display device. The IMOD display device includes one or more interferometric MEMS display elements. In these devices, the pixels of the MEMS display elements can be in either a bright or dark state. In the bright ("relaxed," "open" or "on") state, the display element reflects a large portion of incident visible light, e.g., to a user. Conversely, in the dark ("actuated," "closed" or "off") state, the display element reflects little incident visible light. In some implementations, the light reflectance properties of the on and off states may be reversed. MEMS pixels can be configured to reflect predominantly at particular wavelengths allowing for a color display in addition to black and white.

The IMOD display device can include a row/column array of IMODs. Each IMOD can include a pair of reflective layers, i.e., a movable reflective layer and a fixed partially reflective layer, positioned at a variable and controllable distance from each other to form an air gap (also referred to as an optical gap or cavity). The movable reflective layer may be moved between at least two positions. In a first position, i.e., a relaxed position, the movable reflective layer can be positioned at a relatively large distance from the fixed partially reflective layer. In a second position, i.e., an actuated position, the movable reflective layer can be positioned more closely to the partially reflective layer. Incident light that reflects from the two layers can interfere constructively or destructively depending on the position of the movable reflective layer, producing either an overall reflective or non-reflective state for each pixel. In some implementations, the IMOD may be in a reflective state when unactuated, reflecting light within the visible spectrum, and may be in a dark state when actuated, reflecting light outside of the visible range (e.g., infrared light). In some other implementations, however, an IMOD may be in a dark state when unactuated, and in a reflective state when actuated. In some implementations, the introduction of an applied voltage can drive the pixels to change states. In some other implementations, an applied charge can drive the pixels to change states.

The depicted portion of the pixel array in FIG. 1 includes two adjacent interferometric modulators 12. In the IMOD 12 on the left (as illustrated), a movable reflective layer 14 is illustrated in a relaxed position at a predetermined distance from an optical stack 16, which includes a partially reflective layer. The voltage $V_0$ applied across the IMOD 12 on the left is insufficient to cause actuation of the movable reflective layer 14. In the IMOD 12 on the right, the movable reflective layer 14 is illustrated in an actuated position near or adjacent the optical stack 16. The voltage $V_{bias}$ applied across the IMOD 12 on the right is sufficient to maintain the movable reflective layer 14 in the actuated position.

In FIG. 1, the reflective properties of pixels 12 are generally illustrated with arrows indicating light 13 incident upon the pixels 12, and light 15 reflecting from the pixel 12 on the left. Although not illustrated in detail, it will be understood by a person having ordinary skill in the art that most of the light 13 incident upon the pixels 12 will be transmitted through the transparent substrate 20, toward the optical stack 16. A portion of the light incident upon the optical stack 16 will be transmitted through the partially reflective layer of the optical stack 16, and a portion will be reflected back through the transparent substrate 20. The portion of light 13 that is transmitted through the optical stack 16 will be reflected at the movable reflective layer 14, back toward (and through) the transparent substrate 20. Interference (constructive or destructive) between the light reflected from the partially reflective layer of the optical stack 16 and the light reflected from the movable reflective layer 14 will determine the wavelength(s) of light 15 reflected from the pixel 12.

The optical stack 16 can include a single layer or several layers. The layer(s) can include one or more of an electrode layer, a partially reflective and partially transmissive layer and a transparent dielectric layer. In some implementations, the optical stack 16 is electrically conductive, partially transparent and partially reflective, and may be fabricated, for example, by depositing one or more of the above layers onto a transparent substrate 20. The electrode layer can be formed from a variety of materials, such as various metals, for example indium tin oxide (ITO). The partially reflective layer can be formed from a variety of materials that are partially reflective, such as various metals, e.g., chromium (Cr), semiconductors, and dielectrics. The partially reflective layer can be formed of one or more layers of materials, and each of the layers can be formed of a single material or a combination of materials. In some implementations, the optical stack 16 can include a single semi-transparent thickness of metal or semiconductor which serves as both an optical absorber and conductor, while different, more conductive layers or portions (e.g., of the optical stack 16 or of other structures of the IMOD) can serve to bus signals between IMOD pixels. The optical stack 16 also can include one or more insulating or dielectric layers covering one or more conductive layers or a conductive/absorptive layer.

In some implementations, the layer(s) of the optical stack 16 can be patterned into parallel strips, and may form row electrodes in a display device as described further below. As will be understood by one having skill in the art, the term "patterned" is used herein to refer to masking as well as etching processes. In some implementations, a highly conductive and reflective material, such as aluminum (Al), may be used for the movable reflective layer 14, and these strips may form column electrodes in a display device. The movable reflective layer 14 may be formed as a series of parallel strips of a deposited metal layer or layers (orthogonal to the row electrodes of the optical stack 16) to form columns deposited on top of posts 18 and an intervening sacrificial material deposited between the posts 18. When the sacrificial material is etched away, a defined gap 19, or optical cavity, can be formed between the movable reflective layer 14 and the optical stack 16. In some implementations, the spacing between posts 18 may be approximately 1-1000 um, while the gap 19 may be less than 10,000 Angstroms (Å).

In some implementations, each pixel of the IMOD, whether in the actuated or relaxed state, is essentially a capacitor formed by the fixed and moving reflective layers. When no voltage is applied, the movable reflective layer 14 remains in a mechanically relaxed state, as illustrated by the pixel 12 on the left in FIG. 1, with the gap 19 between the movable reflective layer 14 and optical stack 16. However, when a potential difference, e.g., voltage, is applied to at least one of a selected row and column, the capacitor formed at the intersection of the row and column electrodes at the corresponding pixel becomes charged, and electrostatic forces pull the electrodes together. If the applied voltage exceeds a threshold, the movable reflective layer 14 can deform and move near or against the optical stack 16. A dielectric layer (not shown) within the optical stack 16 may prevent shorting and control the separation distance between the layers 14 and 16, as illustrated by the actuated pixel 12 on the right in FIG. 1. The behavior is the same regardless of the polarity of the applied potential difference. Though a series of pixels in an array may be referred to in some instances as "rows" or "columns," a person having ordinary skill in the art will readily understand that referring to one direction as a "row" and another as a "column" is arbitrary. Restated, in some orientations, the rows can be considered columns, and the columns considered to be rows. Furthermore, the display elements may be evenly arranged in orthogonal rows and columns (an "array"), or arranged in non-linear configurations, for example, having certain positional offsets with respect to one another (a "mosaic"). The terms "array" and "mosaic" may refer to either configuration. Thus, although the display is referred to as including an "array" or "mosaic," the elements themselves need not be arranged orthogonally to one another, or disposed in an even distribution, in any instance, but may include arrangements having asymmetric shapes and unevenly distributed elements.

Figure 2:
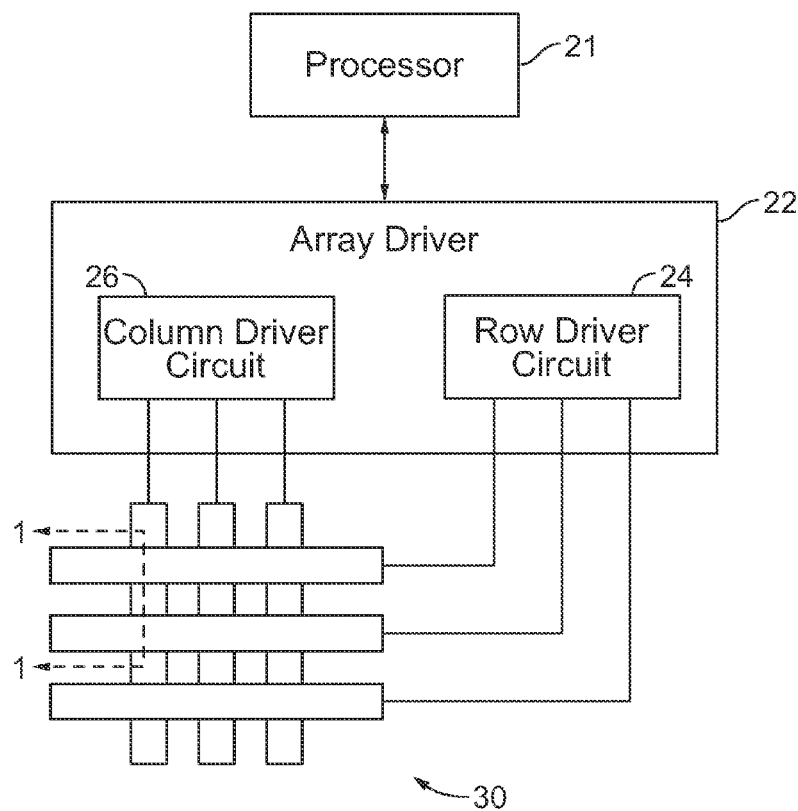
FIG. 2 shows an example of a system block diagram illustrating an electronic device incorporating a 3×3 interferometric modulator display.

FIG. 2 shows an example of a system block diagram illustrating an electronic device incorporating a 3×3 interferometric modulator display. The electronic device includes a processor 21 that may be configured to execute one or more software modules. In addition to executing an operating system, the processor 21 may be configured to execute one or more software applications, including a web browser, a telephone application, an email program, or any other software application.

The processor 21 can be configured to communicate with an array driver 22. The array driver 22 can include a row driver circuit 24 and a column driver circuit 26 that provide signals to, e.g., a display array or panel 30. The cross section of the IMOD display device illustrated in FIG. 1 is shown by the lines 1-1 in FIG. 2. Although FIG. 2 illustrates a 3×3 array of IMODs for the sake of clarity, the display array 30 may contain a very large number of IMODs, and may have a different number of IMODs in rows than in columns, and vice versa.

Figures 3, 4:
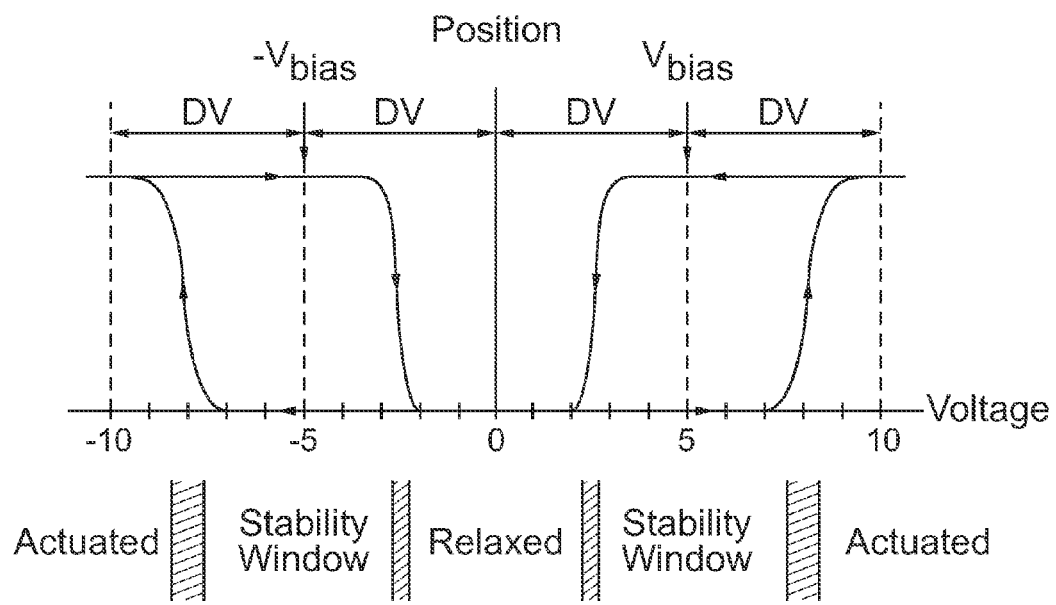
FIG. 3 shows an example of a diagram illustrating movable reflective layer position versus applied voltage for the interferometric modulator of FIG. 1.
FIG. 4 shows an example of a table illustrating various states of an interferometric modulator when various common and segment voltages are applied.

FIG. 3 shows an example of a diagram illustrating movable reflective layer position versus applied voltage for the interferometric modulator of FIG. 1. For MEMS interferometric modulators, the row/column (i.e., common/segment) write procedure may take advantage of a hysteresis property of these devices as illustrated in FIG. 3. An interferometric modulator may require, for example, about a 10-volt potential difference to cause the movable reflective layer, or mirror, to change from the relaxed state to the actuated state. When the voltage is reduced from that value, the movable reflective layer maintains its state as the voltage drops back below, e.g., 10-volts, however, the movable reflective layer does not relax completely until the voltage drops below 2-volts. Thus, a range of voltage, approximately 3 to 7-volts, as shown in FIG. 3, exists where there is a window of applied voltage within which the device is stable in either the relaxed or actuated state. This is referred to herein as the "hysteresis window" or "stability window." For a display array 30 having the hysteresis characteristics of FIG. 3, the row/column write procedure can be designed to address one or more rows at a time, such that during the addressing of a given row, pixels in the addressed row that are to be actuated are exposed to a voltage difference of about 10-volts, and pixels that are to be relaxed are exposed to a voltage difference of near zero volts. After addressing, the pixels are exposed to a steady state or bias voltage difference of approximately 5-volts such that they remain in the previous strobing state. In this example, after being addressed, each pixel sees a potential difference within the "stability window" of about 3-7-volts. This hysteresis property feature enables the pixel design, e.g., illustrated in FIG. 1, to remain stable in either an actuated or relaxed pre-existing state under the same applied voltage conditions. Since each IMOD pixel, whether in the actuated or relaxed state, is essentially a capacitor formed by the fixed and moving reflective layers, this stable state can be held at a steady voltage within the hysteresis window without substantially consuming or losing power. Moreover, essentially little or no current flows into the IMOD pixel if the applied voltage potential remains substantially fixed.

In some implementations, a frame of an image may be created by applying data signals in the form of "segment" voltages along the set of column electrodes, in accordance with the desired change (if any) to the state of the pixels in a given row. Each row of the array can be addressed in turn, such that the frame is written one row at a time. To write the desired data to the pixels in a first row, segment voltages corresponding to the desired state of the pixels in the first row can be applied on the column electrodes, and a first row pulse in the form of a specific "common" voltage or signal can be applied to the first row electrode. The set of segment voltages can then be changed to correspond to the desired change (if any) to the state of the pixels in the second row, and a second common voltage can be applied to the second row electrode. In some implementations, the pixels in the first row are unaffected by the change in the segment voltages applied along the column electrodes, and remain in the state they were set to during the first common voltage row pulse. This process may be repeated for the entire series of rows, or alternatively, columns, in a sequential fashion to produce the image frame. The frames can be refreshed and/or updated with new image data by continually repeating this process at some desired number of frames per second.

The combination of segment and common signals applied across each pixel (that is, the potential difference across each pixel) determines the resulting state of each pixel. FIG. 4 shows an example of a table illustrating various states of an interferometric modulator when various common and segment voltages are applied. As will be readily understood by one having ordinary skill in the art, the "segment" voltages can be applied to either the column electrodes or the row electrodes, and the "common" voltages can be applied to the other of the column electrodes or the row electrodes.

As illustrated in FIG. 4 (as well as in the timing diagram shown in FIG. 5B), when a release voltage $VC_{REL}$ is applied along a common line, all interferometric modulator elements along the common line will be placed in a relaxed state, alternatively referred to as a released or unactuated state, regardless of the voltage applied along the segment lines, i.e., high segment voltage $VS_H$ and low segment voltage $VS_L$. In particular, when the release voltage $VC_{REL}$ is applied along a common line, the potential voltage across the modulator (alternatively referred to as a pixel voltage) is within the relaxation window (see FIG. 3, also referred to as a release window) both when the high segment voltage $VS_H$ and the low segment voltage $VS_L$ are applied along the corresponding segment line for that pixel.

When a hold voltage is applied on a common line, such as a high hold voltage $VC_{HOLD\_H}$ or a low hold voltage $VC_{HOLD\_L}$, the state of the interferometric modulator will remain constant. For example, a relaxed IMOD will remain in a relaxed position, and an actuated IMOD will remain in an actuated position. The hold voltages can be selected such that the pixel voltage will remain within a stability window both when the high segment voltage $VS_H$ and the low segment voltage $VS_L$ are applied along the corresponding segment line. Thus, the segment voltage swing, i.e., the difference between the high $VS_H$ and low segment voltage $VS_L$, is less than the width of either the positive or the negative stability window.

When an addressing, or actuation, voltage is applied on a common line, such as a high addressing voltage $VC_{ADD\_H}$ or a low addressing voltage $VC_{ADD\_L}$, data can be selectively written to the modulators along that line by application of segment voltages along the respective segment lines. The segment voltages may be selected such that actuation is dependent upon the segment voltage applied. When an addressing voltage is applied along a common line, application of one segment voltage will result in a pixel voltage within a stability window, causing the pixel to remain unactuated. In contrast, application of the other segment voltage will result in a pixel voltage beyond the stability window, resulting in actuation of the pixel. The particular segment voltage which causes actuation can vary depending upon which addressing voltage is used. In some implementations, when the high addressing voltage $VC_{ADD\_H}$ is applied along the common line, application of the high segment voltage $VS_H$ can cause a modulator to remain in its current position, while application of the low segment voltage $VS_L$ can cause actuation of the modulator. As a corollary, the effect of the segment voltages can be the opposite when a low addressing voltage $VC_{ADD\_L}$ is applied, with high segment voltage $VS_H$ causing actuation of the modulator, and low segment voltage $VS_L$ having no effect (i.e., remaining stable) on the state of the modulator.

In some implementations, hold voltages, address voltages, and segment voltages may be used which always produce the same polarity potential difference across the modulators. In some other implementations, signals can be used which alternate the polarity of the potential difference of the modulators. Alternation of the polarity across the modulators (that is, alternation of the polarity of write procedures) may reduce or inhibit charge accumulation which could occur after repeated write operations of a single polarity.

Figure 5A:
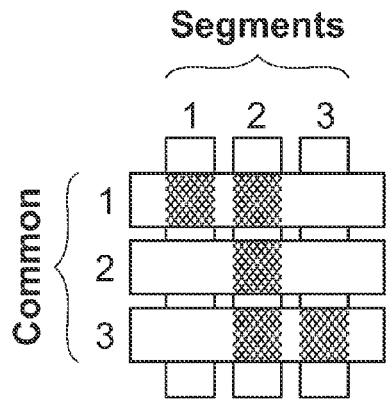
FIG. 5A shows an example of a diagram illustrating a frame of display data in the 3×3 interferometric modulator display of FIG. 2.
Figure 5B:
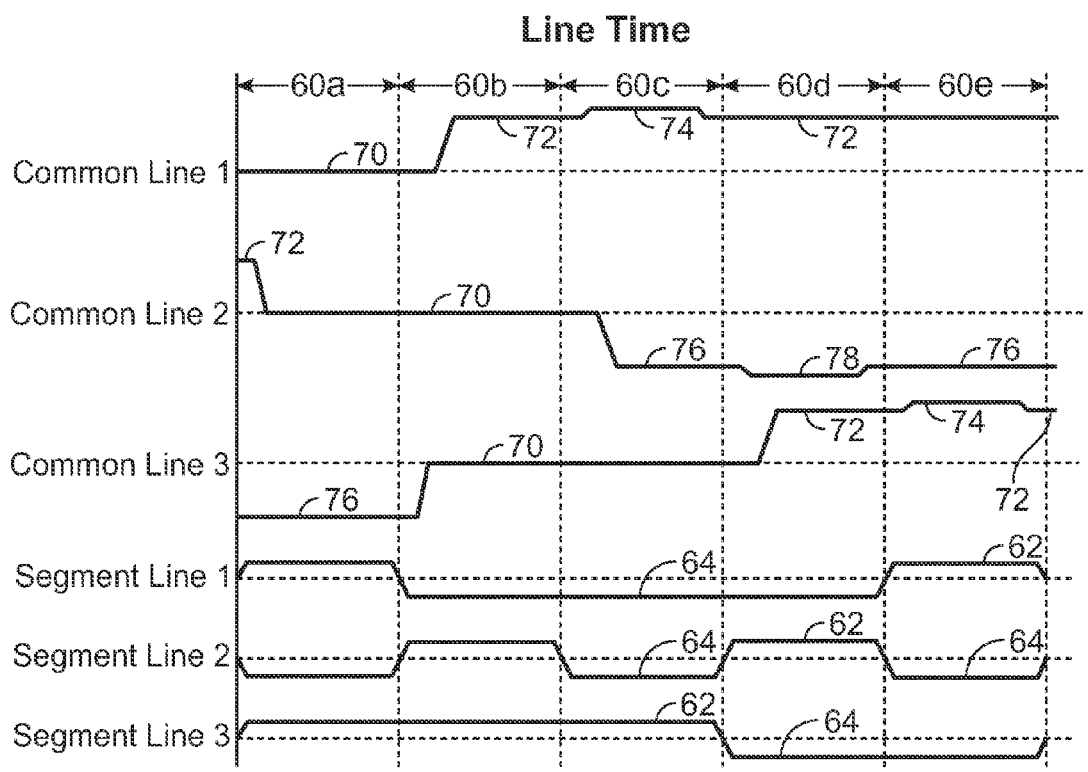
FIG. 5B shows an example of a timing diagram for common and segment signals that may be used to write the frame of display data illustrated in FIG. 5A.

FIG. 5A shows an example of a diagram illustrating a frame of display data in the 3×3 interferometric modulator display of FIG. 2. FIG. 5B shows an example of a timing diagram for common and segment signals that may be used to write the frame of display data illustrated in FIG. 5A. The signals can be applied to the, e.g., 3×3 array of FIG. 2, which will ultimately result in the line time 60e display arrangement illustrated in FIG. 5A. The actuated modulators in FIG. 5A are in a dark-state, i.e., where a substantial portion of the reflected light is outside of the visible spectrum so as to result in a dark appearance to, e.g., a viewer. Prior to writing the frame illustrated in FIG. 5A, the pixels can be in any state, but the write procedure illustrated in the timing diagram of FIG. 5B presumes that each modulator has been released and resides in an unactuated state before the first line time 60a.

During the first line time 60a: a release voltage 70 is applied on common line 1; the voltage applied on common line 2 begins at a high hold voltage 72 and moves to a release voltage 70; and a low hold voltage 76 is applied along common line 3. Thus, the modulators (common 1, segment 1), (1,2) and (1,3) along common line 1 remain in a relaxed, or unactuated, state for the duration of the first line time 60a, the modulators (2,1), (2,2) and (2,3) along common line 2 will move to a relaxed state, and the modulators (3,1), (3,2) and (3,3) along common line 3 will remain in their previous state. With reference to FIG. 4, the segment voltages applied along segment lines 1, 2 and 3 will have no effect on the state of the interferometric modulators, as none of common lines 1, 2 or 3 are being exposed to voltage levels causing actuation during line time 60a (i.e., VC$_{REL}$–relax and VC$_{HOLD\_L}$–stable).

During the second line time 60b, the voltage on common line 1 moves to a high hold voltage 72, and all modulators along common line 1 remain in a relaxed state regardless of the segment voltage applied because no addressing, or actuation, voltage was applied on the common line 1. The modulators along common line 2 remain in a relaxed state due to the application of the release voltage 70, and the modulators (3,1), (3,2) and (3,3) along common line 3 will relax when the voltage along common line 3 moves to a release voltage 70.

During the third line time 60c, common line 1 is addressed by applying a high address voltage 74 on common line 1. Because a low segment voltage 64 is applied along segment lines 1 and 2 during the application of this address voltage, the pixel voltage across modulators (1,1) and (1,2) is greater than the high end of the positive stability window (i.e., the voltage differential exceeded a predefined threshold) of the modulators, and the modulators (1,1) and (1,2) are actuated. Conversely, because a high segment voltage 62 is applied along segment line 3, the pixel voltage across modulator (1,3) is less than that of modulators (1,1) and (1,2), and remains within the positive stability window of the modulator; modulator (1,3) thus remains relaxed. Also during line time 60c, the voltage along common line 2 decreases to a low hold voltage 76, and the voltage along common line 3 remains at a release voltage 70, leaving the modulators along common lines 2 and 3 in a relaxed position.

During the fourth line time 60d, the voltage on common line 1 returns to a high hold voltage 72, leaving the modulators along common line 1 in their respective addressed states. The voltage on common line 2 is decreased to a low address voltage 78. Because a high segment voltage 62 is applied along segment line 2, the pixel voltage across modulator (2,2) is below the lower end of the negative stability window of the modulator, causing the modulator (2,2) to actuate. Conversely, because a low segment voltage 64 is applied along segment lines 1 and 3, the modulators (2,1) and (2,3) remain in a relaxed position. The voltage on common line 3 increases to a high hold voltage 72, leaving the modulators along common line 3 in a relaxed state.

Finally, during the fifth line time 60e, the voltage on common line 1 remains at high hold voltage 72, and the voltage on common line 2 remains at a low hold voltage 76, leaving the modulators along common lines 1 and 2 in their respective addressed states. The voltage on common line 3 increases to a high address voltage 74 to address the modulators along common line 3. As a low segment voltage 64 is applied on segment lines 2 and 3, the modulators (3,2) and (3,3) actuate, while the high segment voltage 62 applied along segment line 1 causes modulator (3,1) to remain in a relaxed position. Thus, at the end of the fifth line time 60e, the 3×3 pixel array is in the state shown in FIG. 5A, and will remain in that state as long as the hold voltages are applied along the common lines, regardless of variations in the segment voltage which may occur when modulators along other common lines (not shown) are being addressed.

In the timing diagram of FIG. 5B, a given write procedure (i.e., line times 60a-60e) can include the use of either high hold and address voltages, or low hold and address voltages. Once the write procedure has been completed for a given common line (and the common voltage is set to the hold voltage having the same polarity as the actuation voltage), the pixel voltage remains within a given stability window, and does not pass through the relaxation window until a release voltage is applied on that common line. Furthermore, as each modulator is released as part of the write procedure prior to addressing the modulator, the actuation time of a modulator, rather than the release time, may determine the necessary line time. Specifically, in implementations in which the release time of a modulator is greater than the actuation time, the release voltage may be applied for longer than a single line time, as depicted in FIG. 5B. In some other implementations, voltages applied along common lines or segment lines may vary to account for variations in the actuation and release voltages of different modulators, such as modulators of different colors.

Figure 6A:
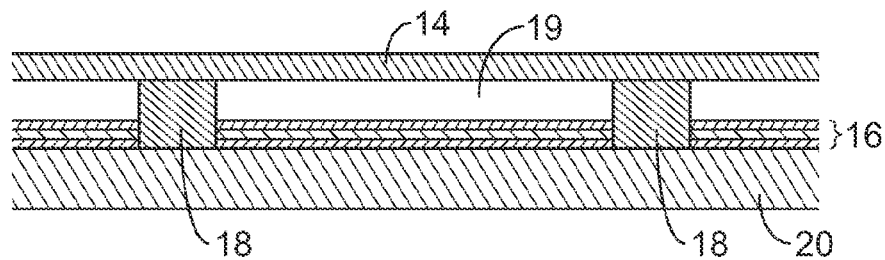
FIG. 6A shows an example of a partial cross-section of the interferometric modulator display of FIG. 1.
Figure 6B:
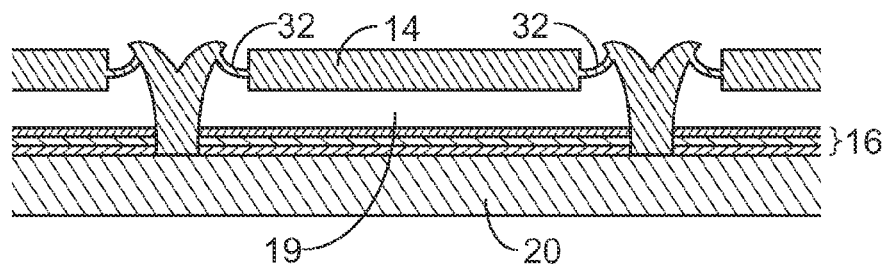
FIGS. 6B-6E show examples of cross-sections of varying implementations of interferometric modulators.
Figure 6C:
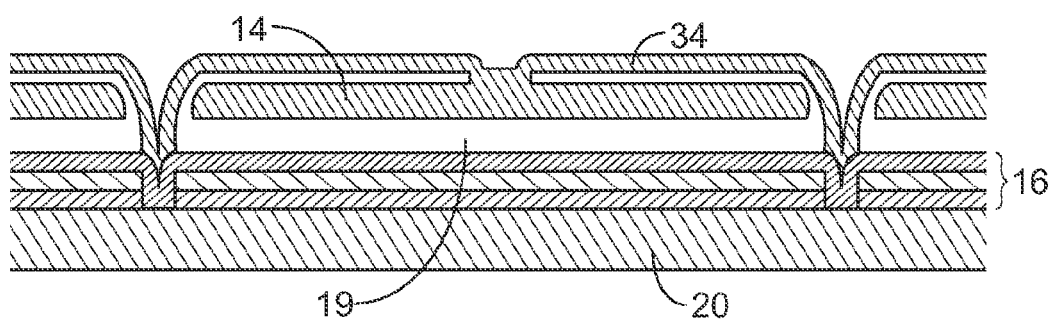

The details of the structure of interferometric modulators that operate in accordance with the principles set forth above may vary widely. For example, FIGS. 6A-6E show examples of cross-sections of varying implementations of interferometric modulators, including the movable reflective layer 14 and its supporting structures. FIG. 6A shows an example of a partial cross-section of the interferometric modulator display of FIG. 1, where a strip of metal material, i.e., the movable reflective layer 14 is deposited on supports 18 extending orthogonally from the substrate 20. In FIG. 6B, the movable reflective layer 14 of each IMOD is generally square or rectangular in shape and attached to supports at or near the corners, on tethers 32. In FIG. 6C, the movable reflective layer 14 is generally square or rectangular in shape and suspended from a deformable layer 34, which may include a flexible metal. The deformable layer 34 can connect, directly or indirectly, to the substrate 20 around the perimeter of the movable reflective layer 14. These connections are herein referred to as support posts. The implementation shown in FIG. 6C has additional benefits deriving from the decoupling of the optical functions of the movable reflective layer 14 from its mechanical functions, which are carried out by the deformable layer 34. This decoupling allows the structural design and materials used for the reflective layer 14 and those used for the deformable layer 34 to be optimized independently of one another.

Figure 6D:
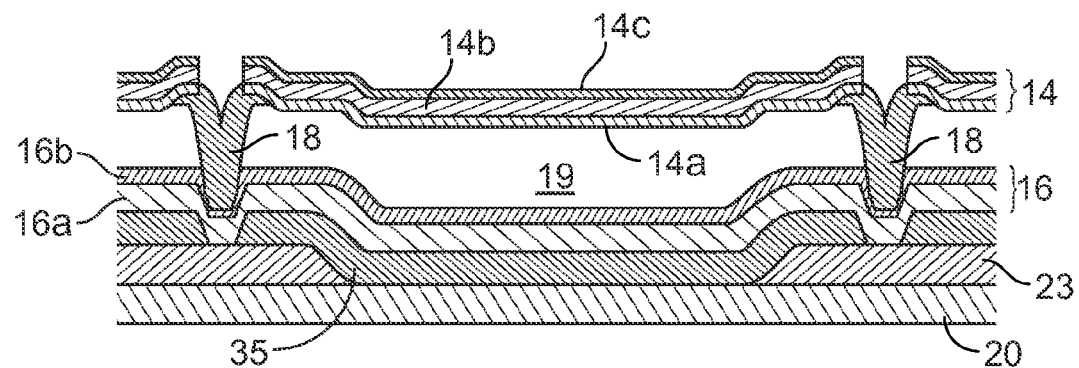

FIG. 6D shows another example of an IMOD, where the movable reflective layer 14 includes a reflective sub-layer 14a. The movable reflective layer 14 rests on a support structure, such as support posts 18. The support posts 18 provide separation of the movable reflective layer 14 from the lower stationary electrode (i.e., part of the optical stack 16 in the illustrated IMOD) so that a gap 19 is formed between the movable reflective layer 14 and the optical stack 16, for example when the movable reflective layer 14 is in a relaxed position. The movable reflective layer 14 also can include a conductive layer 14c, which may be configured to serve as an electrode, and a support layer 14b. In this example, the conductive layer 14c is disposed on one side of the support layer 14b, distal from the substrate 20, and the reflective sub-layer 14a is disposed on the other side of the support layer 14b, proximal to the substrate 20. In some implementations, the reflective sub-layer 14a can be conductive and can be disposed between the support layer 14b and the optical stack 16. The support layer 14b can include one or more layers of a dielectric material, for example, silicon oxynitride (SiON) or silicon dioxide ($SiO_2$). In some implementations, the support layer 14b can be a stack of layers, such as, for example, a $SiO_2$/SiON/$SiO_2$ tri-layer stack. Either or both of the reflective sub-layer 14a and the conductive layer 14c can include, e.g., an aluminum (Al) alloy with about 0.5% copper (Cu), or another reflective metallic material. Employing conductive layers 14a, 14c above and below the dielectric support layer 14b can balance stresses and provide enhanced conduction. In some implementations, the reflective sub-layer 14a and the conductive layer 14c can be formed of different materials for a variety of design purposes, such as achieving specific stress profiles within the movable reflective layer 14.

As illustrated in FIG. 6D, some implementations also can include a black mask structure 23. The black mask structure 23 can be formed in optically inactive regions (e.g., between pixels or under posts 18) to absorb ambient or stray light. The black mask structure 23 also can improve the optical properties of a display device by inhibiting light from being reflected from or transmitted through inactive portions of the display, thereby increasing the contrast ratio. Additionally, the black mask structure 23 can be conductive and be configured to function as an electrical bussing layer. In some implementations, the row electrodes can be connected to the black mask structure 23 to reduce the resistance of the connected row electrode. The black mask structure 23 can be formed using a variety of methods, including deposition and patterning techniques. The black mask structure 23 can include one or more layers. For example, in some implementations, the black mask structure 23 includes a molybdenum-chromium (MoCr) layer that serves as an optical absorber, a layer, and an aluminum alloy that serves as a reflector and a bussing layer, with a thickness in the range of about 30-80 Å, 500-1000 Å, and 500-6000 Å, respectively. The one or more layers can be patterned using a variety of techniques, including photolithography and dry etching, including, for example, carbon tetrafluoride ($CF_4$) and/or oxygen ($O_2$) for the MoCr and $SiO_2$ layers and chlorine ($Cl_2$) and/or boron trichloride ($BCl_3$) for the aluminum alloy layer. In some implementations, the black mask 23 can be an etalon or interferometric stack structure. In such interferometric stack black mask structures 23, the conductive absorbers can be used to transmit or bus signals between lower, stationary electrodes in the optical stack 16 of each row or column. In some implementations, a spacer layer 35 can serve to generally electrically isolate the absorber layer 16a from the conductive layers in the black mask 23.

Figure 6E:
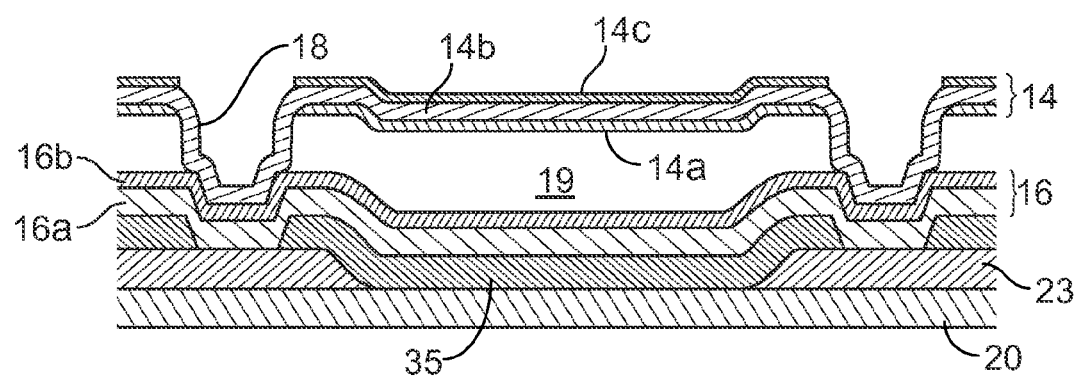

FIG. 6E shows another example of an IMOD, where the movable reflective layer 14 is self supporting. In contrast with FIG. 6D, the implementation of FIG. 6E does not include support posts 18. Instead, the movable reflective layer 14 contacts the underlying optical stack 16 at multiple locations, and the curvature of the movable reflective layer 14 provides sufficient support that the movable reflective layer 14 returns to the unactuated position of FIG. 6E when the voltage across the interferometric modulator is insufficient to cause actuation. The optical stack 16, which may contain a plurality of several different layers, is shown here for clarity including an optical absorber 16a, and a dielectric 16b. In some implementations, the optical absorber 16a may serve both as a fixed electrode and as a partially reflective layer.

In implementations such as those shown in FIGS. 6A-6E, the IMODs function as direct-view devices, in which images are viewed from the front side of the transparent substrate 20, i.e., the side opposite to that upon which the modulator is arranged. In these implementations, the back portions of the device (that is, any portion of the display device behind the movable reflective layer 14, including, for example, the deformable layer 34 illustrated in FIG. 6C) can be configured and operated upon without impacting or negatively affecting the image quality of the display device, because the reflective layer 14 optically shields those portions of the device. For example, in some implementations a bus structure (not illustrated) can be included behind the movable reflective layer 14 which provides the ability to separate the optical properties of the modulator from the electromechanical properties of the modulator, such as voltage addressing and the movements that result from such addressing. Additionally, the implementations of FIGS. 6A-6E can simplify processing, such as, e.g., patterning.

Figure 7:
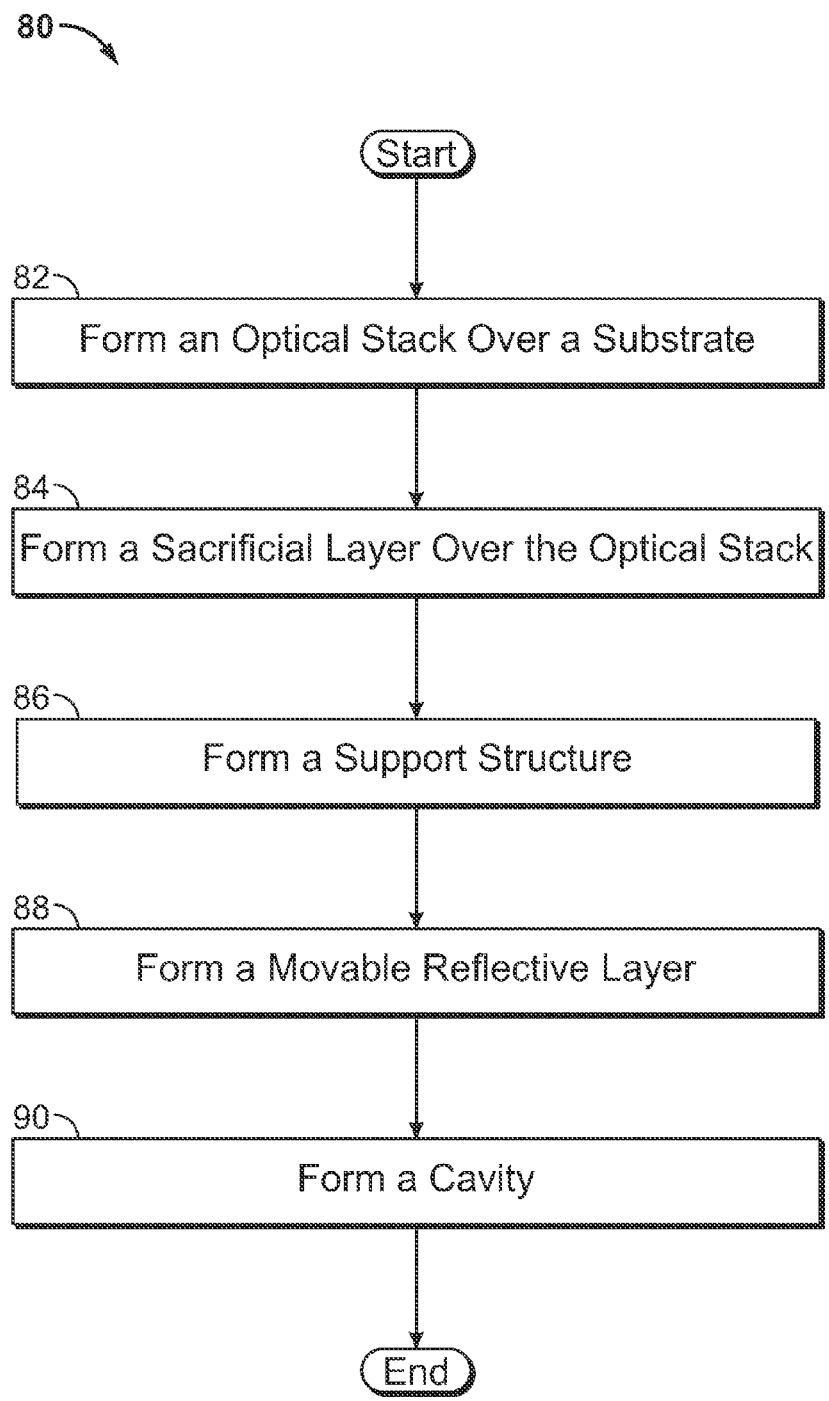
FIG. 7 shows an example of a flow diagram illustrating a manufacturing process for an interferometric modulator.
Figure 8A:
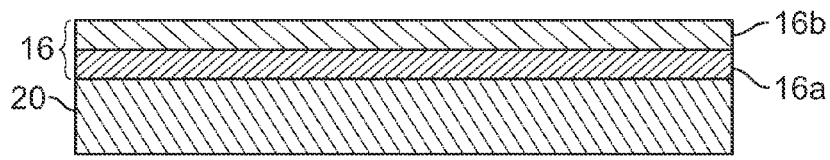
FIGS. 8A-8E show examples of cross-sectional schematic illustrations of various stages in a method of making an interferometric modulator.

FIG. 7 shows an example of a flow diagram illustrating a manufacturing process 80 for an interferometric modulator, and FIGS. 8A-8E show examples of cross-sectional schematic illustrations of corresponding stages of such a manufacturing process 80. In some implementations, the manufacturing process 80 can be implemented to manufacture, e.g., interferometric modulators of the general type illustrated in FIGS. 1 and 6, in addition to other blocks not shown in FIG. 7. With reference to FIGS. 1, 6 and 7, the process 80 begins at block 82 with the formation of the optical stack 16 over the substrate 20. FIG. 8A illustrates such an optical stack 16 formed over the substrate 20. The substrate 20 may be a transparent substrate such as glass or plastic, it may be flexible or relatively stiff and unbending, and may have been subjected to prior preparation processes, e.g., cleaning, to facilitate efficient formation of the optical stack 16. As discussed above, the optical stack 16 can be electrically conductive, partially transparent and partially reflective and may be fabricated, for example, by depositing one or more layers having the desired properties onto the transparent substrate 20. In FIG. 8A, the optical stack 16 includes a multilayer structure having sub-layers 16a and 16b, although more or fewer sub-layers may be included in some other implementations. In some implementations, one of the sub-layers 16a, 16b can be configured with both optically absorptive and conductive properties, such as the combined conductor/absorber sub-layer 16a. Additionally, one or more of the sub-layers 16a, 16b can be patterned into parallel strips, and may form row electrodes in a display device. Such patterning can be performed by a masking and etching process or another suitable process known in the art. In some implementations, one of the sub-layers 16a, 16b can be an insulating or dielectric layer, such as sub-layer 16b that is deposited over one or more metal layers (e.g., one or more reflective and/or conductive layers). In addition, the optical stack 16 can be patterned into individual and parallel strips that form the rows of the display.

Figure 8B:
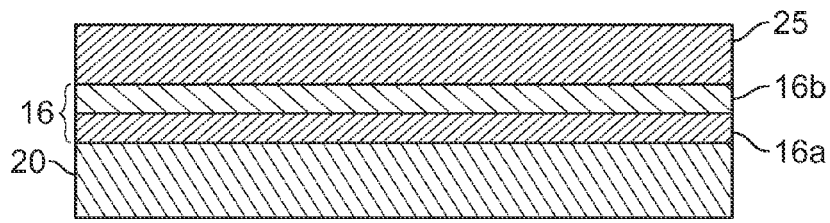

The process 80 continues at block 84 with the formation of a sacrificial layer 25 over the optical stack 16. The sacrificial layer 25 is later removed (e.g., at block 90) to form the cavity 19 and thus the sacrificial layer 25 is not shown in the resulting interferometric modulators 12 illustrated in FIG. 1. FIG. 8B illustrates a partially fabricated device including a sacrificial layer 25 formed over the optical stack 16. The formation of the sacrificial layer 25 over the optical stack 16 may include deposition of a xenon difluoride ($XeF_2$)-etchable material such as molybdenum (Mo) or amorphous silicon (a-Si), in a thickness selected to provide, after subsequent removal, a gap or cavity 19 (see also FIGS. 1 and 8E) having a desired design size. Deposition of the sacrificial material may be carried out using deposition techniques such as physical vapor deposition (PVD, e.g., sputtering), plasma-enhanced chemical vapor deposition (PECVD), thermal chemical vapor deposition (thermal CVD), or spin-coating.

Figure 8C:
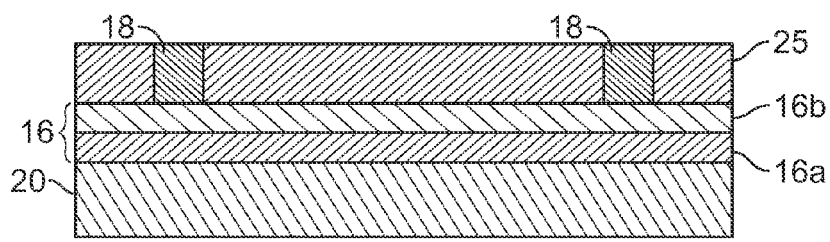

The process 80 continues at block 86 with the formation of a support structure e.g., a post 18 as illustrated in FIGS. 1, 6 and 8C. The formation of the post 18 may include patterning the sacrificial layer 25 to form a support structure aperture, then depositing a material (e.g., a polymer or an inorganic material, e.g., silicon oxide) into the aperture to form the post 18, using a deposition method such as PVD, PECVD, thermal CVD, or spin-coating. In some implementations, the support structure aperture formed in the sacrificial layer can extend through both the sacrificial layer 25 and the optical stack 16 to the underlying substrate 20, so that the lower end of the post 18 contacts the substrate 20 as illustrated in FIG. 6A. Alternatively, as depicted in FIG. 8C, the aperture formed in the sacrificial layer 25 can extend through the sacrificial layer 25, but not through the optical stack 16. For example, FIG. 8E illustrates the lower ends of the support posts 18 in contact with an upper surface of the optical stack 16. The post 18, or other support structures, may be formed by depositing a layer of support structure material over the sacrificial layer 25 and patterning portions of the support structure material located away from apertures in the sacrificial layer 25. The support structures may be located within the apertures, as illustrated in FIG. 8C, but also can, at least partially, extend over a portion of the sacrificial layer 25. As noted above, the patterning of the sacrificial layer 25 and/or the support posts 18 can be performed by a patterning and etching process, but also may be performed by alternative etching methods.

Figure 8D:
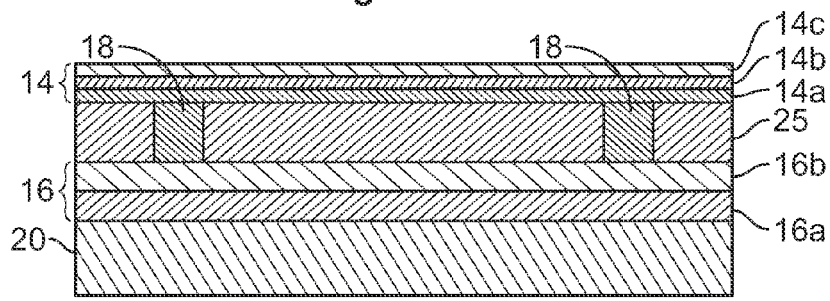
Figure 8E:
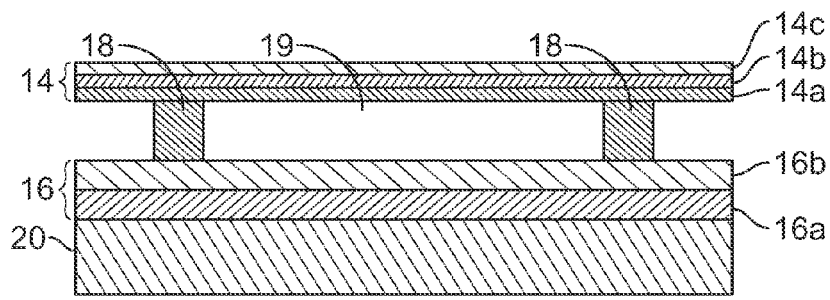

The process 80 continues at block 88 with the formation of a movable reflective layer or membrane such as the movable reflective layer 14 illustrated in FIGS. 1, 6 and 8D. The movable reflective layer 14 may be formed by employing one or more deposition steps, e.g., reflective layer (e.g., aluminum, aluminum alloy) deposition, along with one or more patterning, masking, and/or etching steps. The movable reflective layer 14 can be electrically conductive, and referred to as an electrically conductive layer. In some implementations, the movable reflective layer 14 may include a plurality of sub-layers 14a, 14b, 14c as shown in FIG. 8D. In some implementations, one or more of the sub-layers, such as sub-layers 14a, 14c, may include highly reflective sub-layers selected for their optical properties, and another sub-layer 14b may include a mechanical sub-layer selected for its mechanical properties. Since the sacrificial layer 25 is still present in the partially fabricated interferometric modulator formed at block 88, the movable reflective layer 14 is typically not movable at this stage. A partially fabricated IMOD that contains a sacrificial layer 25 may also be referred to herein as an "unreleased" IMOD. As described above in connection with FIG. 1, the movable reflective layer 14 can be patterned into individual and parallel strips that form the columns of the display.

The process 80 continues at block 90 with the formation of a cavity, e.g., cavity 19 as illustrated in FIGS. 1, 6 and 8E. The cavity 19 may be formed by exposing the sacrificial material 25 (deposited at block 84) to an etchant. For example, an etchable sacrificial material such as Mo or amorphous Si may be removed by dry chemical etching, e.g., by exposing the sacrificial layer 25 to a gaseous or vaporous etchant, such as vapors derived from solid $XeF_2$ for a period of time that is effective to remove the desired amount of material, typically selectively removed relative to the structures surrounding the cavity 19. Other etching methods, e.g. wet etching and/or plasma etching, also may be used. Since the sacrificial layer 25 is removed during block 90, the movable reflective layer 14 is typically movable after this stage. After removal of the sacrificial material 25, the resulting fully or partially fabricated IMOD may be referred to herein as a "released" IMOD.

Figure 9A:
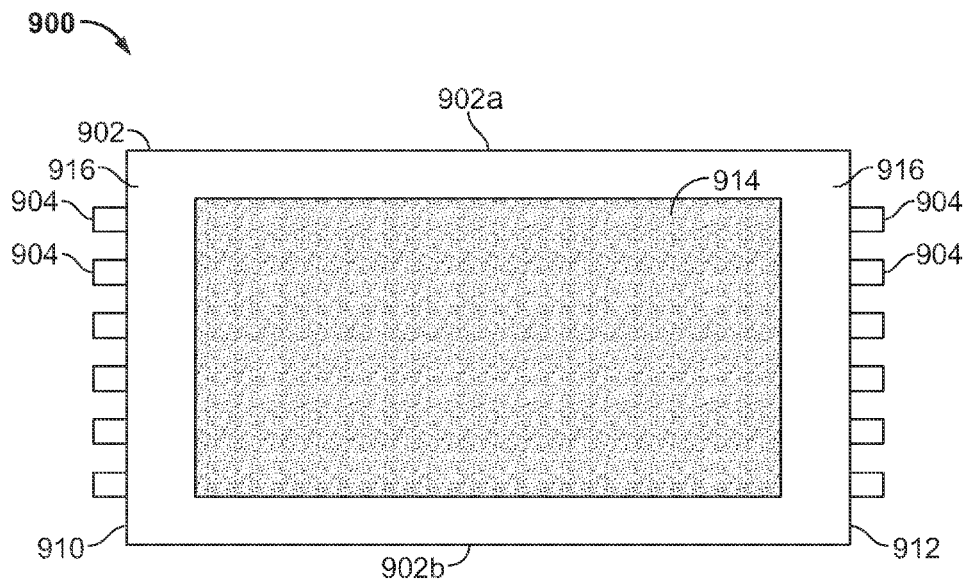
FIG. 9A shows an example of a plan view of an illumination system.

FIG. 9A shows an example of a plan view of an illumination system. The illumination system 900 includes a light guide 902 and one or more light sources 904. The light sources 904 are arranged adjacent to a first light-input edge 910 and a second light-input edge 912. In the example illustrated, the light sources 904 include a plurality of discrete, spaced-apart light sources, for example light emitting diodes (LEDs). In some other implementations, the light sources 904 can include any suitable light source, for example, an incandescent bulb. In some other implementations, the arrays of light sources 904 can be replaced by, for example, an edge bar, a fluorescent lamp, and/or an LED light bar extending across one or both of the light-input edges 910 and 912.

Figure 9B:
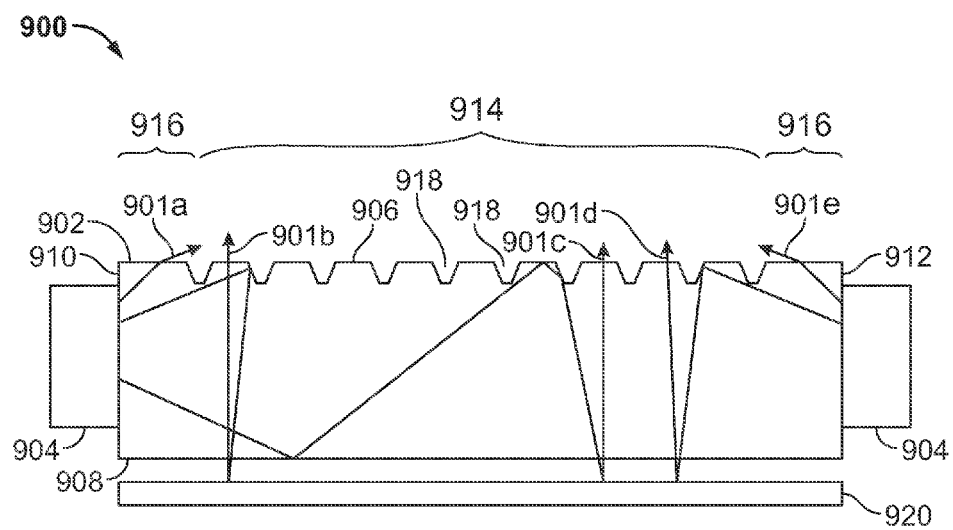
FIG. 9B shows an example of a cross-sectional view of the illumination system shown in FIG. 9A.

FIG. 9B shows an example of a cross-sectional view of the illumination system shown in FIG. 9A. The light guide 902 includes a top major surface 906 and a bottom major surface 908. In certain implementations, light from the light sources 904 is injected into the light guide 902 such that a portion of the light propagates in a direction across at least a portion of the light guide 902 at a low-graze angle relative to the top and bottom major surfaces 906 and 908 of the light guide 902, such that the light is reflected within the light guide 902 by total internal reflection (TIR) off of the light guide's top and bottom major surfaces 906 and 908. In some implementations, optical cladding layers (not shown) having a lower refractive index than the refractive index of the light guide 902 (for example, approximately 0.05 or more lower than the refractive index of the light guide 902, or approximately 0.1 or more lower than the refractive index of the light guide 902) may be disposed on the top and bottom major surfaces 906 and 908 of the light guide 902 to facilitate TIR off of those surfaces. In various implementations, the light guide 902 can be formed of one or more of the following materials: acrylics, acrylate copolymers, UV-curable resins, polycarbonates, cycloolefin polymers, polymers, organic materials, inorganic materials, silicates, alumina, sapphire, glasses, polyethylene terephthalate ("PET"), polyethylene terephthalate glycol ("PET-G"), silicon oxy-nitride, and/or other optically transparent materials.

The light guide 902 may be utilized as part of a front light positioned forward of an array of reflective display elements 920. The reflective display elements can be, for example, interferometric modulators (such as the IMODs 12 shown in FIG. 1). In some other implementations, the light guide 902 may be disposed rearward of an array of display elements, for use as a backlight.

With continued reference to FIG. 9B, the light turning features 918 in the light guide 902 can redirect the light towards the array 920 of display elements at an angle sufficient that at least some of the light passes out of the light guide 902 to the array 920. The redirected light passing out of the light guide 902 can be considered to be extracted out of the light guide 902. In some implementations, such as the illustrated example, the light-turning features 918 are part of recesses formed in the top major surface 906 of the light guide 902. The sides of the recesses may be reflective. For example, air or other material filling the recesses may allow reflection by TIR. In some other implementations, as discussed further herein, the light-turning features 918 may include one or more layers of different materials as coating(s) (not shown) on surfaces of the light-turning features 918. Such coating layers can be configured to increase reflectivity of the light-turning features 918, for example, by including a reflective metal layer.

With reference to both FIGS. 9A and 9B, the light guide 902 may be divided into two regions: a view region 914 and a ledge region 916. The view region 914 of the light guide 902 is substantially directly aligned with the array 920, such that a viewer would perceive an image as being displayed in the view region 914. The view region 914 can include a plurality of light-turning features 918 configured to redirect light (e.g., 901b-d) from the light sources 904 towards the underlying array 920 of display elements. As noted above, in some implementations, the reflective display elements can reflect the redirected light forwards, through the light guide 902 and towards a viewer (not shown). In some other implementations, the display elements can be transmissive and light can propagate through the array 920 to a viewer (not shown) on a side of the array 920 opposite the light guide 902.

The ledge region 916 includes at least the area between the light sources 904 and the view region 914. In certain implementations, the ledge region 916 can also include those regions of the light guide 902 that extend between the view regions 914 and transverse edges 902a and 902b extending between the light-input edges 910 and 912. As illustrated, in some implementations, the ledge region 916 can circumscribe the view region 914.

Although much of the light emitted from light sources 904 may be injected into and may propagate along the length of the light guide 902 by TIR, a portion of the light is injected and enters the light guide 902 at steep angles such that this portion of the light does not undergo TIR. For example, light rays 901b-c illustrate paths of light injected into the light guide 902 by light sources 904. Light rays 901b-c are injected at relatively shallow angles with respect to the top major surface 906, and accordingly propagate along the light guide 902 until they strike one of the light-turning features 918 and are thereby extracted from the light guide 902. Light rays 901a and 901e, in contrast, are injected into the light guide 902 at relatively steep angles measured with respect to the top major surface 906 of the light guide 908. Such steep-angle light may leak out of the light guide 902 in the ledge region 916, as shown in FIG. 9B. In certain situations, as discussed herein, the light may leak out of the light guide 902 in the ledge region 916 because it strikes either the top or bottom major surface 906 or 908 of the light guide 902 at an angle sufficiently steep to violate the conditions for total internal reflection. Another cause of light leakage in the ledge region 916, as also discussed herein, can be attributed to imperfections in the top or bottom major surfaces 906 or 908 of the light guide 902. Light striking such imperfections may also leak from the light guide 902 in the ledge region 916. As discussed herein, light leakage in the ledge region is generally undesirable, as such light does not contribute to illumination of the array 920 of display elements. Additionally, such light may reach a viewer and detract from the quality of the image produced by the display.

Figure 10A:
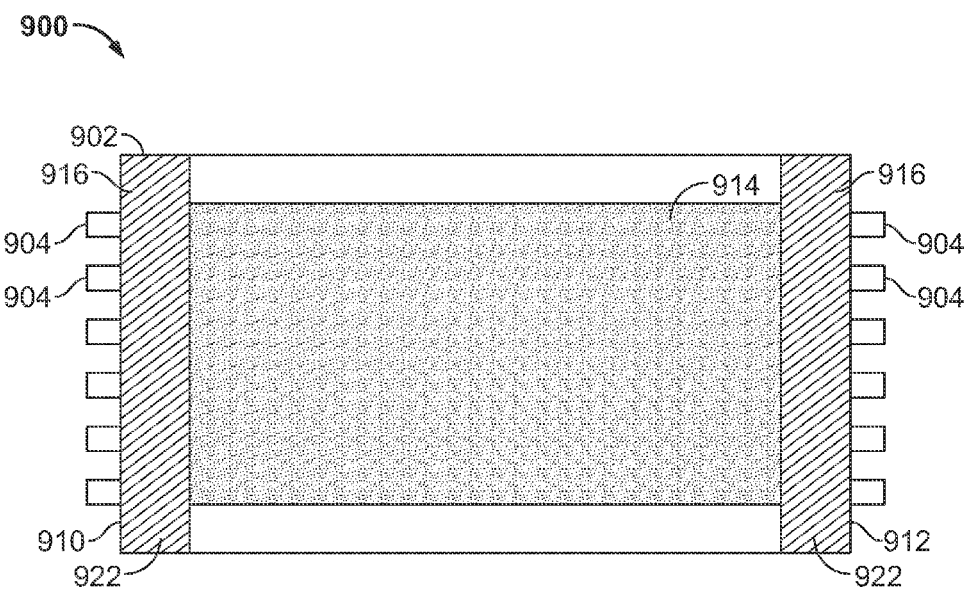
FIG. 10A shows an example of a plan view of an illumination system including a light guide with an at least partially non-transmissive layer coating the ledge regions.

FIG. 10A shows an example of a plan view of an illumination system including a light guide with an at least partially non-transmissive layer coating the ledge regions. As illustrated, a layer 922 has been applied in the ledge region 916 adjacent the light input edges 910 and 912 of the light guide 902. The layer 922 may be at least partially non-transmissive, thereby reducing light leakage out of the ledge region 916. In certain implementations, the layer 922 may also be partially reflective, partially absorptive, and/or partially transmissive. The layer 922 can include a plurality of sub-layers, as described further herein. As illustrated, the layer 922 may be positioned in the ledge region 922 over both the top major surface 906 and the bottom major surface 908 of the light guide 902. In some other implementations, the layer 922 may be positioned over only one of the top and bottom major surfaces of the light guide 902. In some implementations, the layer 922 may extend over substantially an entirety of the area of the ledge region 916 between the view region 914 and a nearest light guide edge 910 or 912. In some other implementations, the layer 922 may extend only partly over the area of the ledge region 916 between the view region 914 and a nearest light guide edge 910 or 912.

Figure 10B:
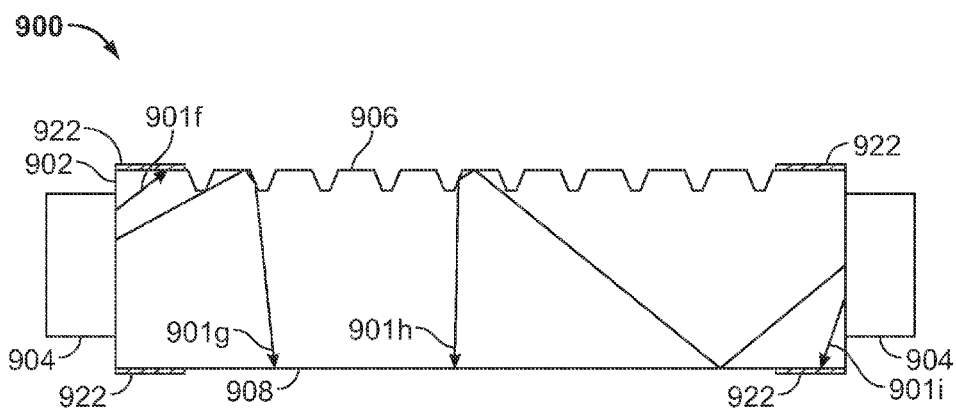
FIG. 10B shows an example of a cross-sectional view of the illumination system shown in FIG. 10A.

FIG. 10B shows a cross-sectional view of the illumination system of FIG. 10A. The presence of the partially non-transmissive layer 922 reduces light leakage in the ledge region 916. For example, steep-angle light emitted from light sources 904 such as light rays 901f and 901i can be absorbed by the partially non-transmissive layer 922. In the absence of the layer 922, such steep-angle light may exit the light guide, with the attendant problems discussed herein. Other shallow-angle light rays 901g and 901h may remain unaffected by the layer 922. In some other implementations in which the layer 922 is partially reflective, steep-angle light rays may be reflected 901f and 901i rather than absorbed. The layer 922 can be non-transmissive to varying degrees. For example, in certain implementations, substantially all incident light is absorbed or reflected by the layer 922. In other implementations, only a fraction of incident light is absorbed or reflected. For example, the layer 922 may transmit less than about 70%, less than about 50%, less than about 30%, or less than about 20% of the light incident on that layer from within the light guide 902. By varying the transmissivity of the layer 922, the amount of steep-angle light that is permitted to either leak out of the light guide 902 or reach the view region 914 may be controlled. Such variance may be accomplished, for example, by varying the thickness of the layer 922, or by appropriate selection of the materials forming the layer 922. Additionally, the layer 922 can be reflective or absorptive to varying degrees. In certain implementations, the layer 922 is substantially reflective, and substantially all incident light is reflected. In some other implementations, the layer 922 can be substantially absorptive, and substantially all incident light is absorbed.

The partially non-transmissive layer can be deposited onto the top or bottom major surfaces 906 and 908 of the light guide 902 by a variety of methods. For example, the layer 922 can be deposited using chemical vapor deposition, plasma-enhanced chemical vapor deposition, sputtering, or spin-coating. The composition of the layer 922 can vary depending on desired optical, physical, and/or chemical characteristics. For example, in some implementations the layer 922 can include an absorptive material doped or painted on the surface of the ledge region, a neutral density filter laminated onto the surface of the ledge region, and/or a three-layer "black mask" structure formed in the ledge region, as described herein. In some implementations, the partially non-transmissive layer can include rare earth transition elements, selenide, and/or other molecules having high extinction coefficients (for example, on the order of about $10^{-2}$ mm or more).

Figure 11A:
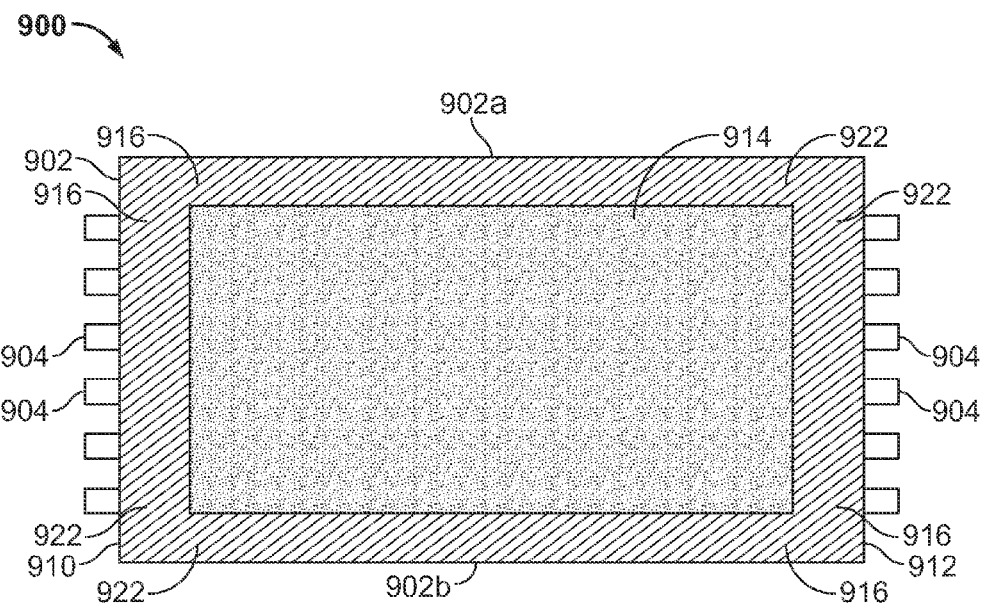
FIG. 11A shows an example of a plan view of an illumination system including a light guide with an at least partially non-transmissive layer coating the ledge regions.
Figure 11B:
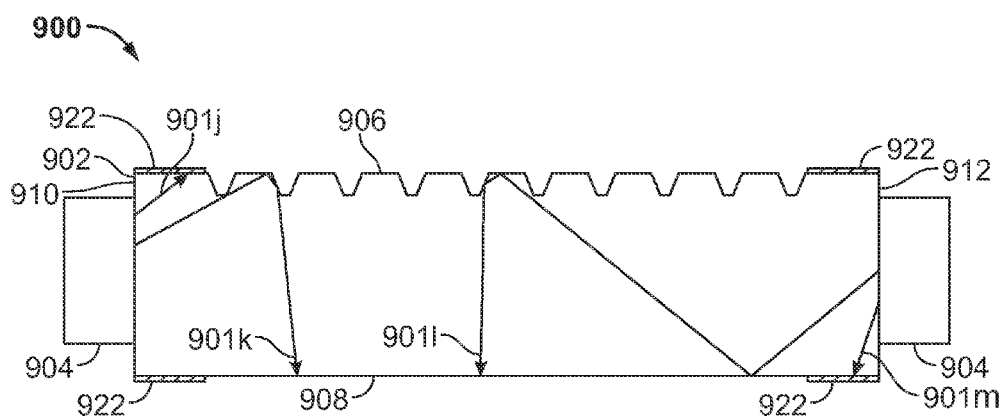
FIG. 11B shows an example of a cross-sectional view of the illumination system shown in FIG. 11A.

FIG. 11A shows an example of a plan view of an illumination system including a light guide with an at least partially non-transmissive layer coating the ledge regions. The example illustrated in FIGS. 11A and 11B is similar to that described above with respect to FIGS. 10A and 10B. In some implementations, however, as illustrated, the layer 922 may be applied to the ledge region 916 beyond the portions of the light guide 902 between the view region 914 and the nearest light input edge 910 or 912. In addition to those areas coated with the layer 922 in the example illustrated in FIGS. 10A and 10B, those portions of the light guide 902 that fall outside of the view region 902 and lie adjacent to and between the view region 914 and the transverse edges 902a and 902b of the light guide 902 can be coated with the layer 922. In some implementations, the view region 914 can be circumscribed by the ledge region 916 and the layer 922 can circumscribe the view region 914. In some other implementations, the ledge region 916 may not extend to completely surround the view region 914 and the layer 922 only extend partly around the view region 914.

FIG. 11B shows a cross-sectional view of the illumination system of FIG. 11A. Covering the additional areas between the view region 914 and the transverse edges 902a and 902b with the layer 922 can further reduce light leakage to improve image quality. In these additional areas, light leakage can occur due to imperfections in the major surfaces of the light guide 902, as discussed herein, and/or due to a change in angle caused by reflections from the edges 902a and 902b. For example, light propagating across the light guide 902 may impinge on one of the edges 902a and 902b, and be reflected towards one of the major surfaces 906 or 908 at an angle that does not undergo TIR. Light leakage along the transverse edges 902a and 902b may be reduced by coating the entire ledge region 916 around the view region 914 with the layer 922, including those portions of the ledge region 916 that are furthest from the light sources 904. As with previous examples, steep-angle light rays 901j and 901m can strike the layer 922, be at least partially reflected or absorbed, and hence, reducing leakage in the ledge region 916. Other light rays, such as light rays 901k and 901l, that are emitted from light sources 904 at a relatively shallow angle can remain unaffected by the presence of layer 922, since those light rays may not impinge on the layer 922.

Figure 12A:
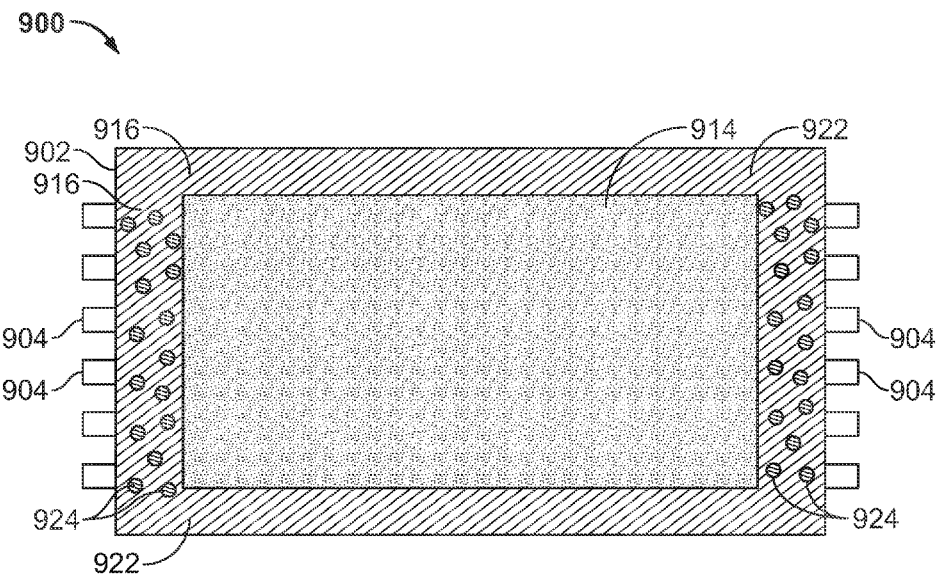
FIG. 12A shows an example of a plan view of an illumination system including a light guide with an at least partially non-transmissive layer and light-turning microstructures in the ledge region.

FIG. 12A shows an example of a plan view of an illumination system including a light guide with an at least partially non-transmissive layer and light-turning microstructures in the ledge region. In some implementations, layer 922 further includes microstructures 924 throughout. In some implementations, the sizes of individual microstructures may range from under one micron to several microns, for example between about 0.5 and about 8 microns, or between about 1 and about 5 microns, or between about 1 and about 3 microns. With respect to the distribution of microstructures 924, in some implementations, adjacent microstructures have a roughly uniform separation, also known as the "pitch", over at least a portion of the layer 922. In some implementations, the pitch may range from several microns to tens of microns, for example between about 1 microns and about 100 microns, between about 2 microns and about 70 microns, or between about 3 microns and about 40 microns. In some implementations, the microstructures 924 may be formed on the surface of the light guide 902, and the layer 922 may then be formed over the microstructures. In other implementations, the microstructures 924 may be integrated within the layer 922 and the two may be simultaneously formed on the surface of the light guide 902. As discussed herein, the layer 922 may be formed on either or both of the top and bottom major surfaces 906 and 908 of the light guide 902, and can include the ledge regions adjacent to the transverse edges of the light guide 902.

Figure 12B:
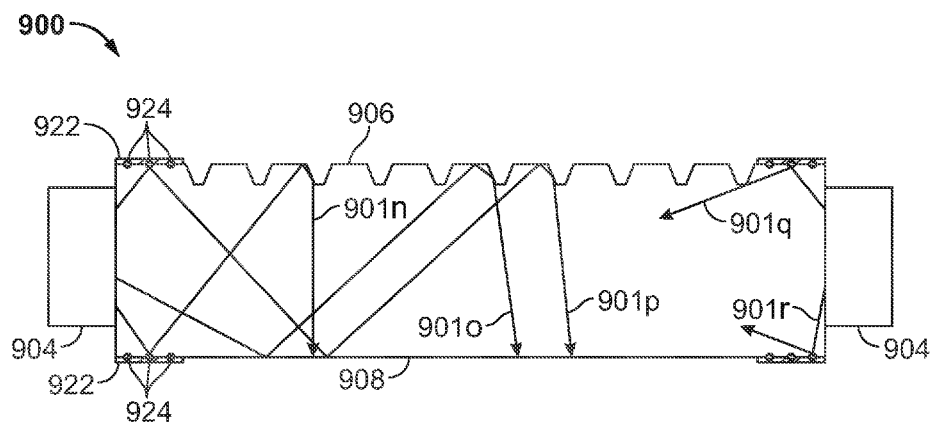
FIG. 12B shows an example of a cross-sectional view of the illumination system shown in FIG. 12A.

FIG. 12B shows a cross-sectional view of the illumination system of FIG. 12A. In some implementations, the microstructures may be configured to redirect incident light such that it is reflected at a shallower angle than the incident angle. For example, light rays 901q and 901r may strike the microstructures 924 embedded within layer 922 at a steep angle. The light rays 901q and 901r may then be redirected at a shallower angle, thereby permitting the light to propagate along the length of the light guide 902 and contribute to illumination of display elements (not shown). In some implementations, the shallower angle is sufficiently shallow to allow the reflected light to undergo TIR. In some other implementations, the microstructures 924 may be configured to reflect incident light, without necessarily altering its angle. For example, light rays 901n and 901p strike microstructures 924 and are reflected at an angle similar to their angle of incidence. The presence of such microstructures 924 within the layer 922 can render the layer 922 partially non-transmissive and partially reflective. As noted above, in some other implementations the layer 922 can be partially non-transmissive and partially reflective based on the selection of materials, and without the need for separate microstructures. As with other examples noted herein, shallow-angle light that is emitted from light sources 904, for example light ray 901o, can remain essentially unaffected by the presence of the layer 922 and microstructures 924. In some implementations, the microstructures 924 may additionally serve to scatter light laterally when viewed from above. For example, steep-angle light incident on the turning microstructures 924 can be both re-directed at a shallower angle along the length of the light guide 902, and can also be scattered laterally within the plane of the light guide 902. Such scattering may contribute to increased illumination uniformity by more evenly distributing the light within the light guide 902. In some implementations, the microstructures 924 can be protrusions or indentations. In some other implementations, the light-turning microstructures 924 can be formed in a separate layer between the layer 922 and the light guide 902.

Figure 13A:
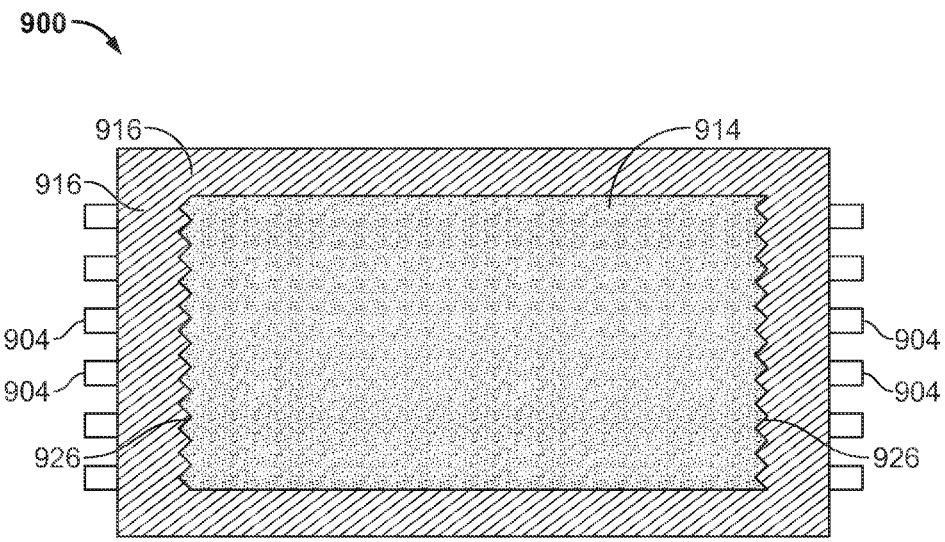
FIG. 13A shows an example of a plan view of an illumination system including a light guide with a nonlinear boundary between the view region and the ledge region.

FIG. 13A shows an example of a plan view of an illumination system including a light guide with a nonlinear boundary between the view region and the ledge region. The interface of the view region 914 and the ledge region 916 defines a boundary 926. In certain implementations, an abrupt boundary 926 between the ledge region 916 and view region 914 can create certain visual artifacts, such as bright bands, in the view region. The presence of layer 922 in the ledge region 916 may further contribute to this effect. For example, light that strikes the top or bottom surfaces 906 and 908, respectively, of the light guide 902 can be reflected within the light guide 902. At the first point of contact with the top or bottom surface 906 or 908 outside of the ledge region 916 (for example, in the view region 914), a portion of the light may leak out of the light guide 902. The light may leak due to imperfections in the glass, or due to the angle of incidence. In either case, this light leakage can result in a bright band across the view region 914. The portion of light that is not leaked out at the first point of contact is reflected back to contact the opposite surface of the light guide 902. At this second point of contact in the view region 914, a second band can be formed, although less bright than the first. This pattern can continue, creating a series of periodic bands, with decreasing brightness from the ledge region 916. To decrease the appearance of these artifacts, the boundary 926 between the ledge region 916 and the view region 914 may have a nonlinear shape. For example, unlike the implementations illustrated in FIGS. 9A-12B, in FIG. 13A and 13B the boundary 926 has a sawtooth pattern. In addition to a sawtooth, other patterns may be employed. These include, for example, jagged, sinusoidal, or irregular boundary shapes. The nonlinear shape of the boundary 926 results in "spreading" the leaked light that would otherwise form a bright line. The light is leaked over a distributed area of the light guide 902, and accordingly the visibility of the bright band artifact is decreased.

Figure 13B:
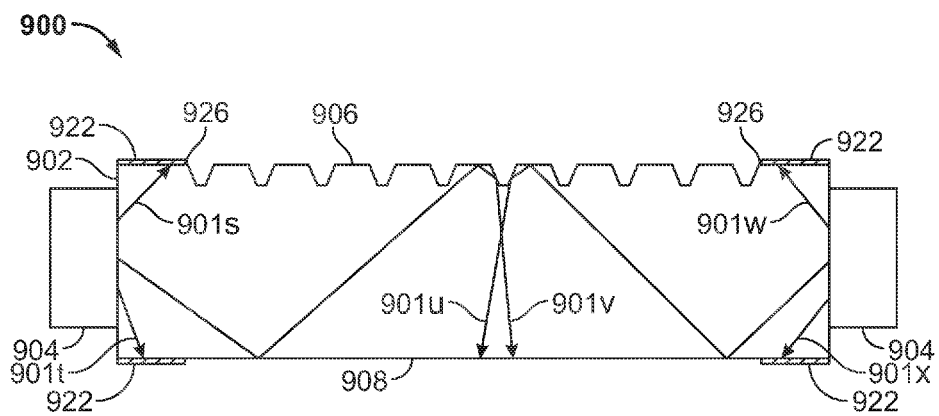
FIG. 13B shows an example of a cross-sectional view of the illumination system shown in FIG. 13A.

FIG. 13B shows a cross-sectional view of the illumination system of FIG. 13A. As illustrated, the layer 922 functions as described previously herein. Steep-angle light, for example light rays 901s, 901t, 901w, and 901x, can strike the layer 922 and be absorbed, or potentially reflected therefrom. In either event, the steep-angle light rays are prohibited from leaking out of the light guide 902 in the ledge region 916. However, the presence of a nonlinear boundary 926 between the ledge region 916 and the view region 914 helps to avoid an abrupt line boundary at which light transitions from being absorbed or reflected by the layer 922 and being extracted from the light guide 902. As noted above, this nonlinear boundary 926 can therefore decrease artifacts and improve illumination uniformity. As with previous examples, shallow-angle light, for example light rays 901u and 901v, can remain unaffected by the presence of layer 922.

It will be understood that while FIGS. 13A and 13B illustrates a layer 922 alone, in other implementations the layer 922 can further include microstructures, as illustrated in FIGS. 12A and 12B. Additionally, while the ledge region 916 circumscribing the review region 914 is entirely coated with layer 922, it will be understood that in some other implementations only a portion of the ledge region 916 is coated with the layer 922, for example, similar to the example illustrated in FIGS. 10A and 10B.

Figure 14:
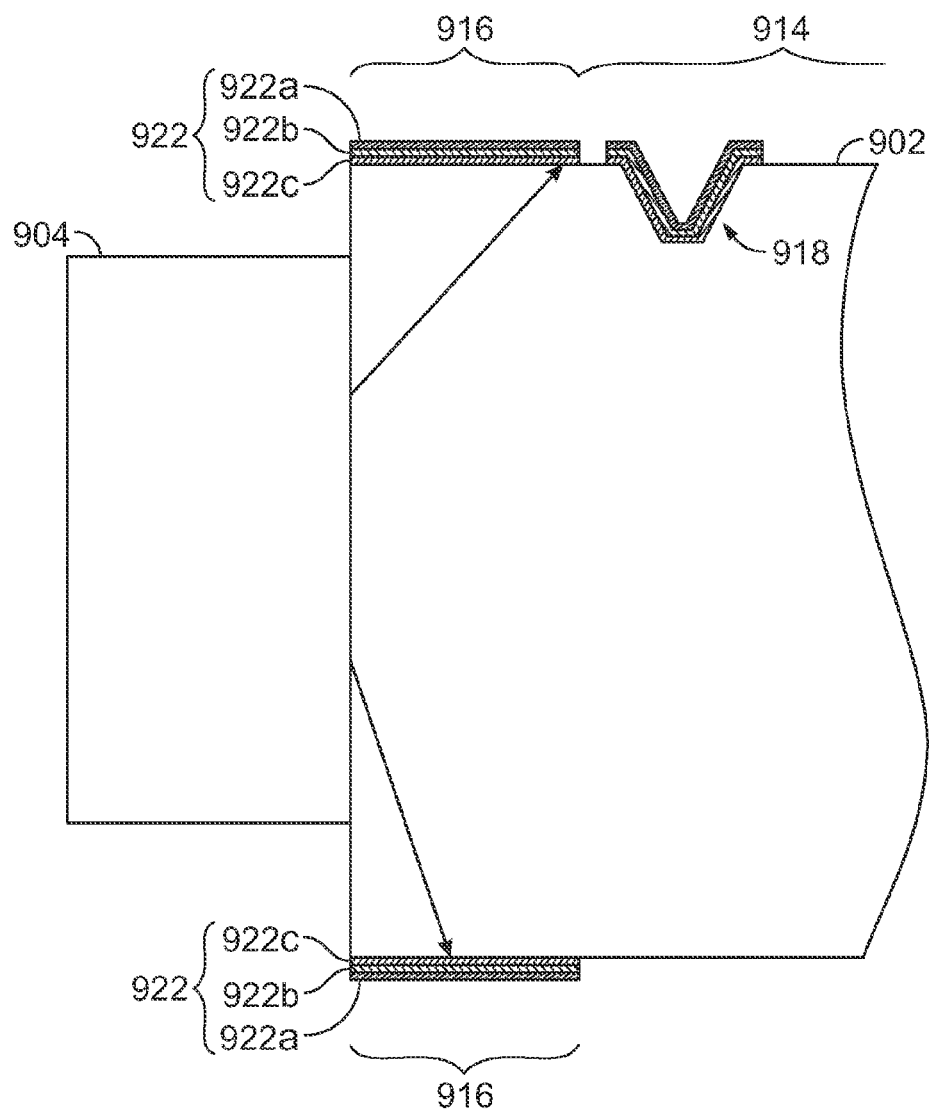
FIG. 14 shows an example of an expanded cross-sectional view of a portion of an illumination system including a light guide with an at least partially non-transmissive layer in the ledge region.

FIG. 14 shows an example of an expanded cross-sectional view of a portion of an illumination system including a light guide with the at least partially non-transmissive layer 922 in the ledge region. The layer 922 can be formed of multiple sub-layers. For example, as illustrated, the layer 922 applied on the light guide 902 in the ledge region 916 can include three sub-layers 922a, 922b, and 922c. The layer 922 can be configured as an interferometric stack having: a partially reflective layer 922a, an optically transmissive spacer layer 922b beneath the partially reflective layer 922a, and a reflective layer 922c that re-directs or reflects light propagating within the light guide 902. The spacer layer 922b is disposed between the reflective layer 922c and the partially reflective layer 922a and defines an optical resonant cavity by its thickness.

The interferometric stack can be configured to give the layer 922 a dark appearance, as seen by a viewer from above, and may therefore be referred to as a "black mask," in some implementations. For example, light can be reflected off of each of the reflective layer 922c and partially reflective layer 922a, with the thickness of the spacer 922b selected such that the reflected light interferes destructively so that the layer 922 appears black or dark as seen from above.

The reflective layer 922c may, for example, include a metal layer, for example, aluminum (Al), nickel (Ni), silver (Ag), molybdenum (Mo), gold (Au), and chromium (Cr). The reflective layer 922c can be between about 100 Å and about 700 Å thick. In one implementation, the reflective layer 922c is about 300 Å thick. The spacer layer 922b can include various optically transmissive materials, for example, air, silicon oxy-nitride (SiOxN), silicon dioxide (SiO2), aluminum oxide (Al2O3), titanium dioxide (TiO2), magnesium fluoride (MgF2), chromium (III) oxide (Cr3O2), silicon nitride (Si3N4), transparent conductive oxides (TCOs), indium tin oxide (ITO), and zinc oxide (ZnO). In some implementations, the spacer layer 922b is between about 500 Å and about 1500 Å thick. In one implementation, the spacer layer 922b is about 800 Å thick. The partially reflective layer 922a can include various materials, for example, molybdenum (Mo), titanium (Ti), tungsten (W), chromium (Cr), etc., as well as alloys, for example, MoCr. The partially reflective 922a can be between about 20 and about 300 Å thick in some implementations. In one implementation, the partially reflective layer 922a is about 80 Å thick. In some implementations, the reflective layer 922c, the spacer layer 922b, and the partially reflective layer 922a can include an Al film, a SiO₂ film, and a MoCr film, respectively.

In certain implementations, the light-turning features 918 in the view region 914 may be coated with the same sub-layers 922a, 922b, and 922c that are applied to the ledge region 916. In some implementations, the sub-layers 922a, 922b, and 922c can be deposited over the entire surface of the light guide, followed by patterning and removal of the sub-layers in various regions, while retaining the sub-layers in the ledge region 916 and the light-turning features 918. In some other implementations, the composition of the sub-layers over the light-turning features 918 may be different from that of the sub-layers 922a, 922b, and 922c over the ledge region 916. For example, in certain implementations, the order of the sub-layers in the ledge region may be reversed, such that 922a is a reflective layer, 922b remains an optically transmissive spacer layer, and 922c is a partially reflective layer. This inverts the "black mask," such that incident light from within the light guide is destructively interfered by the "black mask." Such a black mask can allow the absorption and reflection of light to be controlled by appropriate selection of the thickness of the spacer layer 922b. For example, the thickness of the spacer layer 922b can be selected to cause interference of light at certain wavelengths, while allowing light at other wavelengths to be reflected, thereby providing some control over the wavelength distribution of light in the light guide 902.

In some other implementations, fewer or more sub-layers can be included. For example, in certain implementations, the layer 922 can include two, three, four, five, six or more sub-layers. For each of the various implementations described herein, the at least partially non-transmissive layer 922 can include a plurality of sub-layers, as illustrated in FIG. 14.

Figure 15:
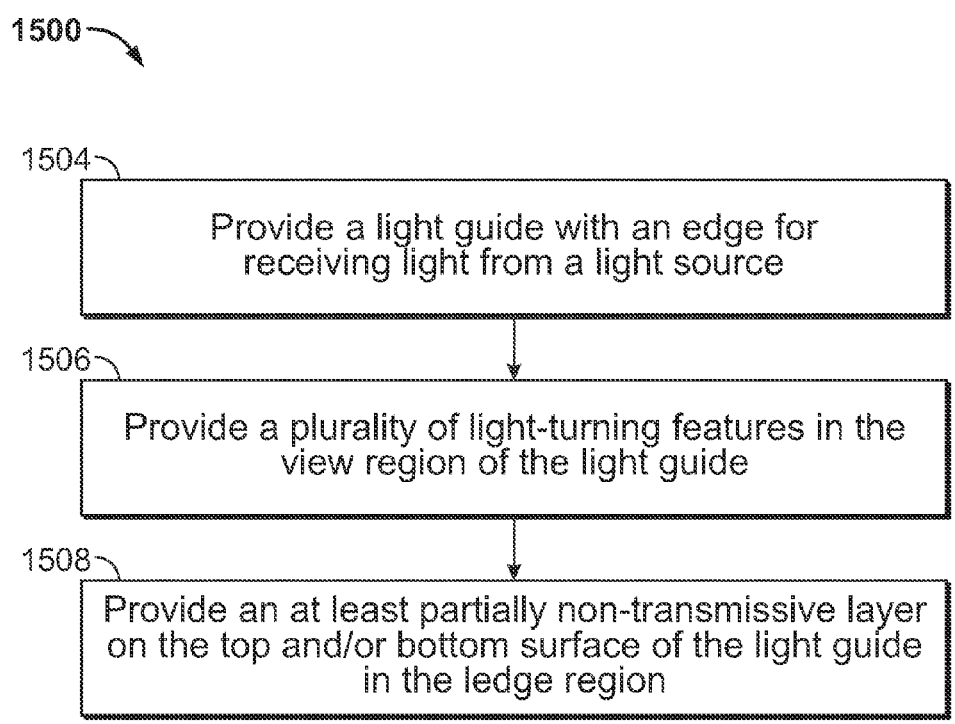
FIG. 15 shows an example of a flow diagram illustrating a manufacturing process for a light guide with at least partially non-transmissive ledges.

FIG. 15 shows an example of a flow diagram illustrating a manufacturing process for a light guide with at least partially non-transmissive ledges. Process 1500 can begin at block 1504 with providing a light guide with an edge for receiving light from a light source. The light source can include any suitable light source, for example, an LED, an incandescent bulb, an edge bar, a fluorescent lamp, an LED light bar, an array of LEDs, and/or another light source. The light guide can be a substantially planar optical sheet, formed of one or more of the following materials: acrylics, acrylate copolymers, UV-curable resins, polycarbonates, cycloolefin polymers, polymers, organic materials, inorganic materials, silicates, alumina, sapphire, glasses, polyethylene terephthalate ("PET"), polyethylene terephthalate glycol ("PET-G"), silicon oxy-nitride, and/or other optically transparent materials. The light guide 902 can be configured such that at least some of the light received from the light source is able to propagate along the length of the light guide by total internal reflection. For example, cladding layers having a lower refractive index than the light guide may be provided on major surfaces of the light guide to promote TIR. Process 1506 continues at block 1506 with providing a plurality of light-turning features in the view region of the light guide. The light-turning features can include recesses, indentations, printed dots, or other suitable mechanisms for turning light in order to extract it from the light guide. The light-turning features can be coated with a layer of metal or other reflective material in order to increase extraction efficiency. The light-turning features may be formed on one or both of the top and bottom major surfaces of the light guide. Process 1500 continues at block 1508 with providing an at least partially non-transmissive layer on the top and/or bottom surface of the light guide in the ledge region. As described previously herein, the ledge region is the area of the light guide outside of the view region, including the area of the light guide between the view region and the light source or sources. The at least partially non-transmissive layer may, in certain implementations, also be at least partially reflective and/or at least partially absorptive. Additionally, in some implementations the partially non-transmissive layer can include microstructures embedded within it. The microstructures can be reflective, and in some implementations can be configured to redirect incident light at an angle more shallow than the angle of incidence. The partially non-transmissive layer can be applied over the entire ledge region. In other implementations, the partially non-transmissive layer can be applied only to portions of the ledge region. As noted above, the partially non-transmissive layer can include an absorptive material doped or painted onto the surface of the ledge region, a neutral density filter laminated onto the surface of the ledge region, and/or a three-layer "black mask"

structure formed in the ledge region. In some implementations, the partially non-transmissive layer can include rare earth transition elements, selenide, and/or other molecules having high extinction coefficients. In some other implementations, the partially non-transmissive layer can include a three-layer structure functioning as a "black mask," as described in more detail herein. The partially non-transmissive layer can be applied by chemical vapor deposition, physical vapor deposition, spin-coating, or any other suitable method. While illustrated as separate blocks interconnected by arrows for ease of illustration and description, the various blocks may be performed in orders different from that indicated by the arrows, or multiple blocks may be performed simultaneously. For example, parts of blocks 1506 and 1508 may overlap in time. For example, a layer deposited to form the light-turning features may also be deposited in the ledge region to form the at least partially non-transmissive layer in that ledge region. In some implementations, providing the at least partially non-transmissive layer can include forming a plurality of microstructures on the top and/or bottom major surface of the light guide in the ledge region. These microstructures can be configured to turn incident light from the light source such that the turned light is emitted at a shallower angle than the incident light. In certain implementations, a light source can be disposed adjacent to the first edge of the light guide, such that the light source is configured to inject light into the first edge.

Figure 16A:
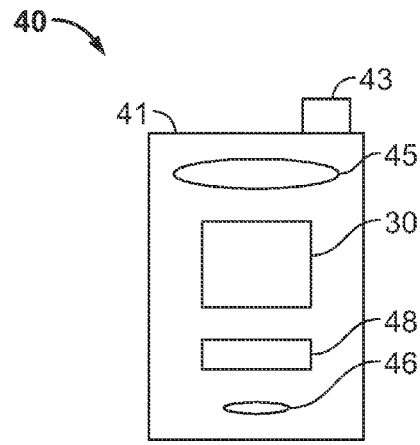
FIGS. 16A and 16B show examples of system block diagrams illustrating a display device that includes a plurality of interferometric modulators.
Figure 16B:
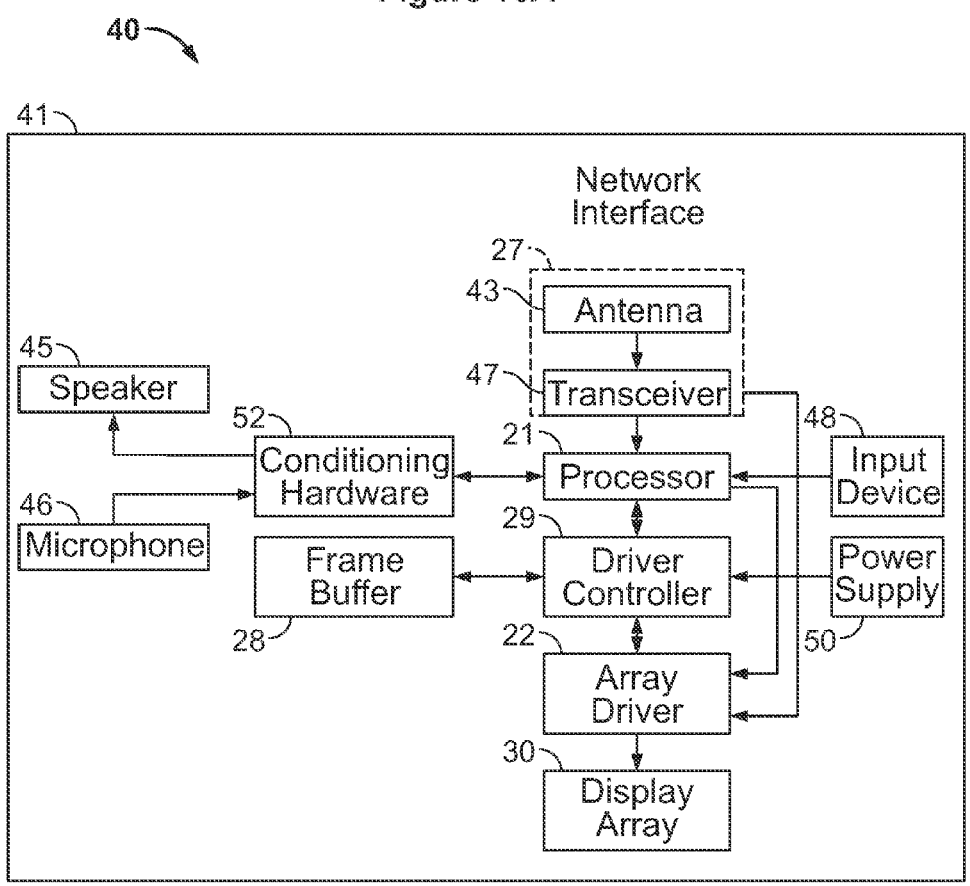

FIGS. 16A and 16B show examples of system block diagrams illustrating a display device 40 that includes a plurality of interferometric modulators. The display device 40 can be, for example, a cellular or mobile telephone. However, the same components of the display device 40 or slight variations thereof are also illustrative of various types of display devices such as televisions, e-readers and portable media players.

The display device 40 includes a housing 41, a display 30, an antenna 43, a speaker 45, an input device 48, and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber, and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be configured to include a flat-panel display, such as plasma, EL, OLED, STN LCD, or TFT LCD, or a non-flat-panel display, such as a CRT or other tube device. In addition, the display 30 can include an interferometric modulator display, as described herein.

The components of the display device 40 are schematically illustrated in FIG. 16B. The display device 40 includes a housing 41 and can include additional components at least partially enclosed therein. For example, the display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 can provide power to all components as required by the particular display device 40 design.

The network interface 27 includes the antenna 43 and the transceiver 47 so that the display device 40 can communicate with one or more devices over a network. The network interface 27 also may have some processing capabilities to relieve, e.g., data processing requirements of the processor 21. The antenna 43 can transmit and receive signals. In some implementations, the antenna 43 transmits and receives RF signals according to the IEEE 16.11 standard, including IEEE 16.11 (a), (b), or (g), or the IEEE 802.11 standard, including IEEE 802.11a, b, g or n. In some other implementations, the antenna 43 transmits and receives RF signals according to the BLUETOOTH standard. In the case of a cellular telephone, the antenna 43 is designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G or 4G technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that is readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation, and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a standalone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of pixels.

In some implementations, the driver controller 29, the array driver 22, and the display array 30 are appropriate for any of the types of displays described herein. For example, the driver controller 29 can be a conventional display controller or a bi-stable display controller (e.g., an IMOD controller). Additionally, the array driver 22 can be a conventional driver or a bi-stable display driver (e.g., an IMOD display driver). Moreover, the display array 30 can be a conventional display array or a bi-stable display array (e.g., a display including an array of IMODs). In some implementations, the driver controller 29 can be integrated with the array driver 22. Such an implementation is common in highly integrated systems such as cellular phones, watches and other small-area displays.

In some implementations, the input device 48 can be configured to allow, e.g., a user to control the operation of the display device 40. The input device 48 can include a keypad, such as a QWERTY keyboard or a telephone keypad, a button, a switch, a rocker, a touch-sensitive screen, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices as are well known in the art. For example, the power supply 50 can be a rechargeable battery, such as a nickel-cadmium battery or a lithium-ion battery. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. The word "exemplary" is used exclusively herein to mean "serving as an example, instance, or illustration." Any implementation described herein as "exemplary" is not necessarily to be construed as preferred or advantageous over other implementations. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the IMOD as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An illumination system comprising:
a first light source; and
a light guide including:
a first surface;
a second surface opposite the first surface;
a first light-input edge for receiving light from the first light source, the first light-input edge extending transverse to and between the first and second surfaces;
a view region of the first and second surfaces; and
a ledge region of the first and second surfaces, the ledge region including the area between the first light-input edge and the view region, wherein at least one of the first surface and the second surface within the ledge region is coated with an at least partially non-transmissive layer in the ledge region,
wherein the at least partially non-transmissive layer includes a plurality of microstructures, wherein the microstructures are configured to turn incident light from the first light source such that the angle of the turned light with respect to the first surface is smaller than the angle of incidence of the light with respect to the first surface.

2. The illumination system of claim 1, wherein the at least partially non-transmissive layer in the ledge region is reflective.

3. The illumination system of claim 1, wherein the at least partially non-transmissive layer is substantially absorptive.

4. The illumination system of claim 1, wherein a boundary between the ledge region and the view region has a nonlinear shape.

5. The illumination system of claim 4, wherein the nonlinear shape is chosen from the group consisting of a sawtooth shape, a sinusoidal shape, a jagged shape, and a random shape.

6. The illumination system of claim 1, wherein the at least partially non-transmissive layer includes a plurality of sub-layers.

7. The illumination system of claim 6, wherein the plurality of sub-layers form a three-layer black mask including a reflective layer, an underlying optically transmissive layer, and a partially-reflective layer underlying the optically transmissive layer.

8. The illumination system of claim 7, further comprising:
a first transverse edge arranged between the first light-input edge and the second light-input edge, and between the first and second surfaces;
a second transverse edge opposite the first transverse edge and arranged between the first light-input edge and the second light-input edge, and between the first and second surfaces;
wherein the ledge region further includes the area between each of the first and second transverse edges and the view region, such that the ledge region circumscribes the view region.

9. The illumination system of claim 1, wherein the at least partially non-transmissive layer is a thin film.

10. The illumination system of claim 1, wherein the first light source is disposed adjacent to the first light-input edge, wherein a second light source is disposed adjacent to a second light-input edge opposite the first light-input edge, and wherein the ledge region further includes the area between the second light-input edge and the view region.

11. A display system comprising the system of claim 1, the display device further comprising a plurality of display elements underlying the second surface in the view region, and wherein light-turning features disposed in the view region are configured to turn light out of the light guide and towards the display elements.

12. The display system of claim 11, further comprising:
a display including the plurality of display elements;
a processor that is configured to communicate with the display, the processor being configured to process image data; and
a memory device that is configured to communicate with the processor.

13. The display system of claim 12, further comprising:
a driver circuit configured to send at least one signal to the display; and
a controller configured to send at least a portion of the image data to the driver circuit.

14. The display system of claim 12, further comprising:
an image source module configured to send the image data to the processor.

15. The display system of claim 14, wherein the image source module includes at least one of a receiver, transceiver, and transmitter.

16. The display system of claim 12, further comprising:
an input device configured to receive input data and to communicate the input data to the processor.

17. An illumination system comprising:
a first light source; and
a light guide including:
a first surface;
a second surface opposite the first surface;
a first light-input edge for receiving light from the first light source, the first light-input edge extending transverse to and between the first and second surfaces;
a view region of the first and second surfaces, wherein the view region includes a plurality of light-turning features defined by indentations in one of the first and second surfaces; and
a ledge region of the first and second surfaces, the ledge region including the area between the first light-input edge and the view region, wherein at least one of the first surface and the second surface within the ledge region is coated with an at least partially non-transmissive layer in the ledge region,
wherein surfaces of the indentations have a coating.

18. The illumination system of claim 17, wherein the at least partially non-transmissive layer is formed of the same material as the coating.

19. The illumination system of claim 17, wherein surfaces of the indentations have a coating including a plurality of sub-layers, each with a particular composition, and wherein the at least partially non-transmissive layer includes an equal number of sub-layers, each having the same composition as one of the sub-layers of the coating.

20. The illumination system of claim 17, wherein the at least partially non-transmissive layer in the ledge region is reflective.

21. The illumination system of claim 17, wherein a boundary between the ledge region and the view region has a nonlinear shape.

22. An illumination system comprising:
a light source; and
a light guide including:

a first surface;
a second surface opposite the first surface;
a first light-input edge for receiving light from the first light source, the first light-input edge extending transverse to and between the first and second surfaces;
a view region of the first and second surfaces;
a ledge region of the first and second surfaces, the ledge region disposed between the first light-input edge and the view region of the light guiding means; and
means for blocking light from exiting the light guide in the ledge region, wherein the light blocking means is disposed on at least one of the first surface and the second surface of the light guide in the ledge region, wherein the light blocking means includes a plurality of microstructures, wherein the microstructures are configured to turn incident light from the first light source such that the angle of the turned light with respect to the first surface is smaller than the angle of incidence of the light with respect to the first surface.

23. The illumination system of claim 22, wherein the view region includes plurality of light turning features having reflective surfaces, diffractive structures, or combinations thereof for redirecting light; and wherein the light blocking means includes an at least partially non-transmissive layer coated on at least one of the first surface and the second surface of the light guide in the ledge region.

24. A method of manufacturing an illumination system, the method comprising:
providing a light guide, wherein the light guide includes:
a first surface;
a second surface opposite the first surface;
a first edge for receiving light from a light source, the first edge extending transverse to and between the first and second surfaces;
a view region of the first and second surfaces; and
providing an at least partially non-transmissive layer on at least one of the first surface and the second surface of the light guide in a ledge region, wherein the ledge region includes the area of the first and second surfaces between the first edge and the view region,
wherein the at least partially non-transmissive layer includes a plurality of microstructures, wherein the microstructures are configured to turn incident light from the first light source such that the angle of the turned light with respect to the first surface is smaller than the angle of incidence of the light with respect to the first surface.

25. The method of claim 24, wherein providing the at least partially non-transmissive layer includes depositing the at least partially non-transmissive layer onto at least one of the first surface and the second surface of the light guide.

26. The method of claim 25, wherein depositing the at least partially non-transmissive layer includes chemical vapor depositing the at least partially non-transmissive layer.

27. The method of claim 25, further comprising patterning the deposited at least partially non-transmissive layer to form a boundary between the at least partially non-transmissive layer and the view region having a nonlinear shape.

28. The method of claim 24, further comprising disposing a light source adjacent to the first edge, the light source configured to inject light into the first edge.

29. A method of manufacturing an illumination system, the method comprising:
providing a light guide, wherein the light guide includes:
a first surface;
a second surface opposite the first surface;
a first edge for receiving light from a light source, the first edge extending transverse to and between the first and second surfaces;
a view region of the first and second surfaces;
providing a plurality of light-turning features in a view region of the light guide, the light-turning features defined by indentations in one of the first and second surfaces, wherein the indentations have a coating; and
providing an at least partially non-transmissive layer on at least one of the first surface and the second surface of the light guide in a ledge region, wherein the ledge region includes the area of the first and second surfaces between the first edge and the view region.

30. The method of claim 29, wherein the at least partially non-transmissive layer is formed of the same material as the coating.

31. The method of claim 29, wherein providing the at least partially non-transmissive layer includes depositing the at least partially non-transmissive layer onto at least one of the first surface and the second surface of the light guide.

32. An illumination system comprising:
a first light source; and
a light guide including:
a first surface;
a second surface opposite the first surface;
a first light-input edge for receiving light from the first light source, the first light-input edge extending transverse to and between the first and second surfaces;
a view region of the first and second surfaces; and
a ledge region of the first and second surfaces, the ledge region including the area between the first light-input edge and the view region, wherein at least one of the first surface and the second surface within the ledge region is coated with an at least partially non-transmissive layer in the ledge region,
wherein the at least partially non-transmissive layer includes a plurality of sub-layers.

33. The illumination system of claim 32, wherein the plurality of sub-layers forms a three-layer black mask including a reflective layer, an underlying optically transmissive layer, and a partially-reflective layer underlying the optically transmissive layer.

34. The illumination system of claim 33, wherein the view region includes a plurality of light-turning features defined by indentations in one of the first and second surfaces, and wherein surfaces of the indentations have a coating including a plurality of sub-layers each having the same composition as one of the sub-layers of the at least partially non-transmissive layer.

35. A method of manufacturing an illumination system, the method comprising:
providing a light guide, wherein the light guide includes:
a first surface;
a second surface opposite the first surface;
a first edge for receiving light from a light source, the first edge extending transverse to and between the first and second surfaces;
a view region of the first and second surfaces; and
providing an at least partially non-transmissive layer on at least one of the first surface and the second surface of the light guide in a ledge region, wherein the ledge region includes the area of the first and second surfaces between the first edge and the view region, the at least partially non-transmissive layer including a plurality of sub-layers.

36. The method of claim 35, wherein the at least partially non-transmissive layer includes a plurality of microstructures configured to turn incident light from the first light source such that the angle of the turned light with respect to the first surface is smaller than the angle of incidence of the light with respect to the first surface.

37. The method of claim 35, further comprising patterning the deposited at least partially non-transmissive layer to form a boundary between the at least partially non-transmissive layer and the view region having a nonlinear shape.

* * * * *